US012748492B2

(12) United States Patent
Nagatomi et al.

(10) Patent No.: US 12,748,492 B2
(45) Date of Patent: Sep. 29, 2026

(54) HEAD-UP DISPLAY SYSTEM HAVING A PLURALITY OF DISPLAY UNITS WITH RESPECTIVE FINAL REFLECTORS

(71) Applicant: Panasonic Automotive Systems Co., Ltd., Kanagawa (JP)

(72) Inventors: Kenji Nagatomi, Osaka (JP); Norihiro Imamura, Osaka (JP); Michihiro Yamagata, Osaka (JP); Yusuke Nihei, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 19/282,393

(22) Filed: Jul. 28, 2025

(65) Prior Publication Data

US 2026/0086632 A1 Mar. 26, 2026

(30) Foreign Application Priority Data

Sep. 26, 2024 (JP) ................................ 2024-167494
Apr. 22, 2025 (JP) ................................ 2025-070170

(51) Int. Cl.
*G06F 3/01* (2006.01)
*G02B 27/01* (2006.01)

(52) U.S. Cl.
CPC ......... *G06F 3/013* (2013.01); *G02B 27/0101* (2013.01); *G02B 27/0149* (2013.01); *G02B 2027/0154* (2013.01)

(58) Field of Classification Search
CPC ..... G06F 3/013; G06F 3/011; G02B 27/0101; G02B 27/0149; G02B 2027/0154; B60K 35/23; G08G 1/16; B60R 1/26
See application file for complete search history.

(56) References Cited

U.S. PATENT DOCUMENTS

2011/0187844 A1* 8/2011 Ogawa ...................... B60R 1/26 348/78
2013/0201540 A1* 8/2013 Sasaki ................ G02B 27/0149 359/221.3
2018/0143431 A1* 5/2018 Matsuura ............... B60K 35/23
2019/0258057 A1 8/2019 Hada et al.
2022/0348080 A1* 11/2022 Sadovitch ............... G06F 3/011
2023/0019904 A1* 1/2023 Kusafuka ........... G02B 27/0101
2023/0211661 A1* 7/2023 Toyoshima ............ B60K 35/23 701/36
2025/0010719 A1* 1/2025 Yahata ..................... G08G 1/16
2025/0277974 A1* 9/2025 Imamura ............ G02B 27/0101

FOREIGN PATENT DOCUMENTS

WO 2018/088362 5/2018

* cited by examiner

*Primary Examiner* — Richard J Hong
(74) *Attorney, Agent, or Firm* — Greenblum & Bernstein, P.L.C.

(57) ABSTRACT

A display system includes a plurality of displays that project a plurality of virtual images in front of a user. The display system estimates a viewpoint position of the user, and adjusts a display position of at least one virtual image among the plurality of virtual images based on an estimation result. Each of the plurality of displays includes: a display element that displays an image on which a corresponding one of the plurality of virtual images is based, and emits image light of the image; and a final reflector that reflects, toward the user, the image light emitted by the display element. The plurality of final reflectors included in the plurality of displays are provided as separate units.

20 Claims, 11 Drawing Sheets

HEAD-UP DISPLAY SYSTEM HAVING A PLURALITY OF DISPLAY UNITS WITH RESPECTIVE FINAL REFLECTORS

CROSS REFERENCE TO RELATED APPLICATIONS

The present application is based on and claims priority of Japanese Patent Application No. 2024-167494 filed on Sep. 26, 2024 and Japanese Patent Application No. 2025-070170 filed on Apr. 22, 2025.

FIELD

The present disclosure relates to a display system.

BACKGROUND

Patent Literature (PTL) 1 discloses a head-up display (HUD) that emits display light, which forms a first virtual image and a second virtual image, toward a front windshield of a vehicle. Accordingly, the first virtual image and the second virtual image are displayed in front of a viewer by using the display light that has been reflected off of the front window. Here, when the viewpoint of the viewer changes, a positional relationship between the first virtual image and the second virtual image becomes misaligned. In order to suppress this misalignment of the positional relationship, PTL 1 discloses an angle adjuster that adjusts the position of at least the first virtual image or the second virtual image, by adjusting the direction of travel of at least one of a first display light that forms the first virtual image or a second display light that forms the second virtual image.

CITATION LIST

Patent Literature

PTL 1: WO 2018/088362

SUMMARY

However, the above-mentioned display system can be improved upon.

In view of this, the present disclosure provides a display system that can further improve upon the related art.

A display system according to one aspect of the present disclosure includes: a plurality of display units that project a plurality of virtual images in front of a user; a viewpoint estimator that estimates a viewpoint position of the user; and an adjuster that adjusts a display position of at least one virtual image among the plurality of virtual images based on an estimation result of the viewpoint estimator, wherein each of the plurality of display units includes: a display element that displays an image on which a corresponding one of the plurality of virtual images is based, and emits image light of the image; and a final reflector that reflects, toward the user, the image light emitted by the display element, and the plurality of final reflectors included in the plurality of display units are provided as separate units.

The display system according to the present disclosure can further improve upon the related art.

BRIEF DESCRIPTION OF DRAWINGS

These and other advantages and features of the present disclosure will become apparent from the following description thereof taken in conjunction with the accompanying drawings that illustrate specific embodiments of the present disclosure.

Figure 1:
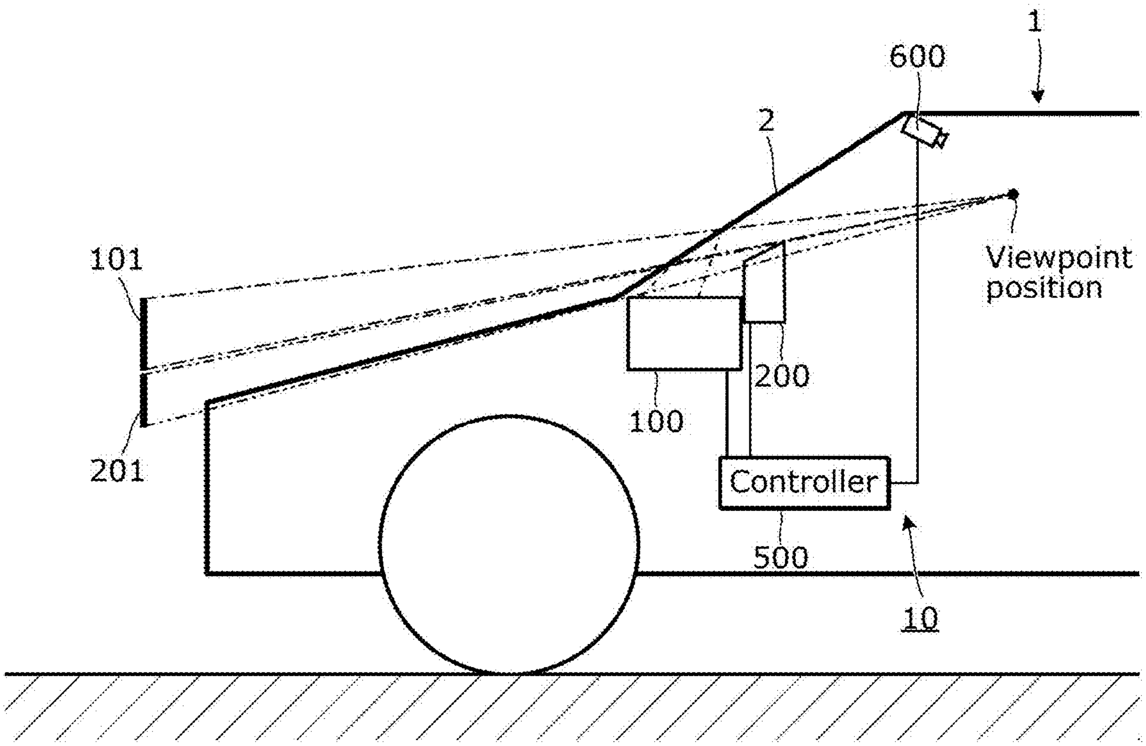
FIG. 1 is a schematic diagram illustrating a state in which a display system according to Embodiment 1 is provided in a vehicle.

DESCRIPTION OF EMBODIMENTS (Underlying Knowledge Forming Basis of the Present Disclosure)

In PTL 1, since the first display light and the second display light are reflected by the front window, common usage of a portion of the optical system becomes necessary, however, a detrimental effect of this is that the optical configuration becomes larger. In view of this, the present disclosure provides a display system whose size can be limited while suppressing positional misalignment of a plurality of virtual images.

(1) A display system according to one aspect of the present disclosure includes: a plurality of display units that project a plurality of virtual images in front of a user; a viewpoint estimator that estimates a viewpoint position of the user; and an adjuster that adjusts a display position of at least one virtual image among the plurality of virtual images based on an estimation result of the viewpoint estimator, in which each of the plurality of display units includes: a display element that displays an image on which a corresponding one of the plurality of virtual images is based, and emits image light of the image; and a final reflector that reflects, toward the user, the image light emitted by the display element, and the plurality of final reflectors included in the plurality of display units are provided as separate units.

In the display system according to (1), the adjuster adjusts the display position of at least one virtual image among the plurality of virtual images based on the viewpoint position of the user estimated by the viewpoint estimator. With this adjustment, positional misalignment of the plurality of virtual images that results from variation in the viewpoint position of the user can be suppressed. Furthermore, since each of the final reflectors provided in the plurality of display units is provided as a separate unit, when compared to a case in which a common final reflector is used, the degree of freedom in designing the optical configuration inside of each display unit can be increased, and the optical configuration can be made more compact. In other words, it is possible to limit the overall size of the display system. As a result, a display system whose size can be limited while suppressing positional misalignment of a plurality of virtual images can be provided.

(2) A display system is the display system according to (1) as described above, in which the adjuster may adjust a display position of each of the plurality of virtual images based on the estimation result of the viewpoint estimator.

In the display system according to (2), since the adjuster adjusts the display position of each virtual image, the relative positional misalignment of the display position of each virtual image can be more finely suppressed.

(3) A display system is the display system according to (1) or (2) as described above, in which the adjuster may adjust a display position of at least one virtual image among the plurality of virtual images to cause a distance between two of the plurality of virtual images to fall within a predetermined interval.

In the display system according to (3), since the adjuster adjusts the display position of at least one virtual image among the plurality of virtual images to cause the distance between two of the plurality of virtual images to fall within the predetermined interval, the distance between the two of the plurality of virtual images can be made to be smaller than the predetermined interval. Accordingly, the two of the plurality of virtual images can be displayed in a compact manner, thereby making it possible to enhance visibility of the two of the plurality of virtual images to the user.

(4) A display system is the display system according to (3) as described above, in which the plurality of virtual images may be arranged in an up-and-down direction, and the adjuster may adjust a display position of at least one virtual image among the plurality of virtual images to cause a distance between a lower edge of a displayable range of a virtual image positioned upward and an upper edge of a displayable range of a virtual image positioned downward to fall within a predetermined range, the virtual image positioned upward and the virtual image positioned downward being a pair of virtual images that are adjacent in the up-and-down direction, the pair of virtual images being included in the plurality of virtual images.

In the display system according to (4), the adjuster adjusts the display position of at least one virtual image among the plurality of virtual images, to cause the distance between the lower edge of the displayable range of the virtual image positioned upward and the upper edge of the displayable range of the virtual image positioned downward to fall within the predetermined interval. Accordingly, the plurality of virtual images can be displayed in the up-and-down direction in a compact manner. Consequently, when the user views the plurality of virtual images, since movement of the line of sight in the up-and-down direction is inhibited, visibility in a left-and-right direction can be enhanced.

(5) A display system is the display system according to any one of (1) to (4) as described above, in which the plurality of display units may be three or more display units.

In the display system according to (5), a display system whose size can be limited can be provided while suppressing positional misalignment of each virtual image displayed by the three or more display units.

(6) A display system is the display system according to any one of (1) to (5) as described above, in which each of the plurality of display units may further include: a plurality of optical components that include the display element and the final reflector; and a mover that moves at least one optical component among the plurality of optical components, and the adjuster may control the mover to adjust the display position.

In the display system according to (6), since the adjuster can control the mover and adjust the display position, the adjuster can adjust the display position of the virtual image by using the mover while keeping a position of an image in the display element constant.

(7) A display system is the display system according to (6) as described above, in which the mover may move at least two optical components among the plurality of optical components.

In the display system according to (7), since one mover moves at least two optical components among the plurality of optical components, when compared to a case in which one mover is provided for each optical component that is an object to be moved, the configuration of the device can be simplified.

(8) A display system is the display system according to (6) or (7) as described above, in which the adjuster may control the mover to cause a viewing distance relative to a lower edge of the virtual image to be shorter than a viewing distance relative to an upper edge of the virtual image.

In the display system according to (8), since the adjuster causes the viewing distance relative to the lower edge of the virtual image to be shorter than the viewing distance relative to the upper edge of the virtual image, the virtual image can be displayed in a manner that more naturally evokes a perception of depth for the driver.

(9) A display system is the display system according to any one of (1) to (5) as described above, in which the adjuster may adjust the display position by adjusting a coordinate position of the image in the display element.

In the display system according to (9), since the display position is adjusted by the adjuster adjusting the coordinate position of the image in the display element, the display position can be adjusted even when a mover is not provided.

(10) A display system is the display system according to any one of (1) to (9) as described above, and may further include: an input unit to which an adjustment command from the user is input, in which the adjuster may adjust a display position of one virtual image, among the plurality of virtual images, based on the adjustment command from the user that is input to the input unit, the viewpoint estimator may estimate the viewpoint position based on an adjustment amount of the one virtual image, and the adjuster may adjust a display position of an other virtual image, among the plurality of virtual images, based on the viewpoint position estimated.

In the display system according to (10), the viewpoint estimator estimates the viewpoint position based on the adjustment amount of one of the virtual images that has been adjusted due to the adjustment command from the user. In other words, even when there is no sensor for detecting the viewpoint position of the user, the viewpoint position can still be estimated. Furthermore, since the adjuster adjusts the display position of the other virtual image based on the viewpoint position estimated, the display position of the other virtual image can be promptly adjusted.

(11) A display system is the display system according to (10) as described above, in which a fine adjustment command from the user may be input to the input unit, and the adjuster may finely adjust the display position of the other virtual image based on the fine adjustment command input to the input unit.

In the display system according to (11), since the display position of the other virtual image can be finely adjusted based on the fine adjustment command, fine adjustments can thereby be made to finely adjust the display position of the other virtual image to a position that is intended by the user.

(12) A display system is the display system according to (10) or (11) as described above, and may further include: a detector that detects the viewpoint position of the user, in which the viewpoint estimator may correct the viewpoint position estimated based on a detection result of the detector.

In the display system according to (12), since the viewpoint estimator corrects the viewpoint position estimated based on the detection result of the detector, the viewpoint position can be more accurately estimated.

(13) A display system is the display system according to any one of (10) to (12) as described above, in which the input unit may be an audio sensor.

In the display system according to (13), since the input unit is a voice sensor, the user can input voice to perform an adjustment command. Consequently, manual input of the user becomes unnecessary when inputting an adjustment command, and the adjustment command can be prevented from interfering with driving operations of the user.

(14) A display system is the display system according to any one of (1) to (9) as described above, and may further include: a camera that captures an image of the user, in which the viewpoint estimator may estimate the viewpoint position of the user based on the image captured by the camera.

In the display system according to (14), since the viewpoint estimator estimates, by using the image captured, the viewpoint position of the user based on the image captured by the camera, the viewpoint position can be estimated with a high degree of accuracy. Consequently, positional misalignment of a plurality of virtual images can be more accurately suppressed.

(15) A display system is the display system according to any one of (1) to (9) as described above, and may further include: a plurality of detectors that detect the viewpoint position of the user, in which the viewpoint estimator may estimate the viewpoint position of the user based on a detection result of the plurality of detectors.

In the display system according to (15), since the viewpoint estimator estimates the viewpoint position of the user based on detection results of the plurality of detectors, the viewpoint position can be estimated with a high degree of accuracy. Consequently, positional misalignment of a plurality of virtual images can be more accurately suppressed.

(16) A display system is the display system according to (4) as described above, in which a reflectance of a final exit surface that forms one virtual image may be larger than a reflectance of a final reflector that forms an other virtual image, the one virtual image and the other virtual image being a pair of virtual images that are adjacent in the up-and-down direction, the one virtual image having a depression angle or an elevation angle with an absolute value that is larger than an absolute value of a depression angle or an elevation angle of the other virtual image, the pair of virtual images being included in the plurality of virtual images.

In the display system according to (16), the reflectance of the final reflector that forms one virtual image is larger than the reflectance of the final reflector that forms the other virtual image. The one virtual image has a depression angle or an elevation angle with a large absolute value that is larger than an absolute value of a depression angle or an elevation angle of the other virtual image. In other words, although the other virtual image that has a depression angle or an elevation angle with a smaller absolute value may be positioned directly in front of the user, since the reflectance of the final reflector that forms the other virtual image is smaller than the reflectance of the final reflector that forms the one virtual image, the brightness of the forward field of view of the user is ensured.

(17) A display system is the display system according to any one of (1) to (16) as described above, in which the plurality of display units may be arranged to cause light paths from the display elements to the final reflectors to be spatially independent of each other.

In the display system according to (17), the plurality of display units are arranged to cause the light paths from the display elements to the final reflectors to be spatially independent of each other. In other words, since the light paths of the display units are spatially independent of each other, maintenance can be simplified.

(18) A display system is the display system according to (17) as described above, in which each of the plurality of display units may further include: a plurality of optical components that include the display element and the final reflector; a housing that houses at least one of the plurality of optical components; and a housing mover that moves the housing, and the adjuster may control the housing mover to adjust the display position.

In the display system according to (18), since the adjuster controls the housing mover to adjust the display position, in the housing, the light path remains constant both before and after adjustment has been performed. Consequently, optical distortion can be suppressed in the virtual images.

(19) A display system is the display system according to any one of (6) to (8) as described above, in which the adjuster may control the mover to adjust a viewing distance of the at least one virtual image by adjusting the display position.

In the display system according to (19), the adjuster controls the mover to adjust the display position, thereby adjusting the viewing distance of the virtual image. Accordingly, a scaling factor of each virtual image can be changed, and the degree of freedom of the display presentation is enhanced.

(20) A display system is the display system according to any one of (1) to (19) as described above, in which the display element may add, to the image, distortion of an amount based on an adjustment amount of the display position.

In the display system according to (20), since the display element adds, to the image, distortion of an amount that is based on the adjustment amount of the display position, an image is displayed by the display element, in which such post-adjustment distortion of the virtual image that may occur is taken into account in advance. Consequently, the virtual image based on the image can be displayed in a state in which distortion is suppressed.

(21) A display system is the display system according to any one of (1) to (20) as described above, and may further include: an informer, in which when an adjustment amount of the display position of the at least one virtual image exceeds an adjustment range of the adjuster, the informer may issue an overrun alert, the at least one virtual image being determined based on the estimation result of the viewpoint estimator.

In the display system according to (21), when the adjustment amount of the display position of the at least one virtual image exceeds the adjustment range of the adjuster, the informer issues an overrun alert. The at least one virtual image is determined based on the estimation result of the viewpoint estimator. Accordingly, due to the overrun alert, the user can recognize the adjustment range of the adjuster, and can move the viewpoint position in accordance with the adjustment range.

(22) A display system is the display system according to any one of (1) to (21) as described above, in which when an adjustment amount of the display position of the at least one virtual image determined based on an estimation result of the viewpoint estimator exceeds an adjustment range of the adjuster, the adjuster may adjust the display position of the at least one virtual image to a position near an upper limit or a lower limit of the adjustment range.

In the display system according to (22), when the adjustment amount of the display position of the at least one virtual image determined based on the estimation result of the viewpoint estimator exceeds the adjustment range of the adjuster, the display position of the at least one virtual image is adjusted to a position near the upper limit or the lower limit of the adjustment range. Accordingly, even for a user whose viewpoint position exceeds the adjustment range, the user is still able to recognize the virtual image that is positioned near the upper limit or the lower limit of the adjustment range by only minimally moving their head to move their viewpoint position.

(23) A display system is the display system according to any one of (1) to (22) as described above, and may further include: an informer; and a determiner that determines whether a line of sight of the user is directed toward a warning object within a predetermined amount of time after the warning object has been displayed in at least one display unit among the plurality of display units, in which when the determiner determines that the line of sight of the user is not directed toward the warning object within the predetermined amount of time, the informer may issue a line-of-sight guidance alert.

In the display system according to (23), when the line of sight of the user is not directed toward the warning object within the predetermined amount of time, since a line-of-sight guidance alert will be issued by the informer, the line of sight of the user can be guided toward the warning object by using the line-of-sight guidance alert.

EMBODIMENTS

Hereinafter, exemplary embodiments will be specifically described with reference to the drawings. It should be noted that the embodiments described below merely illustrate specific examples of the present disclosure. The numerical values, shapes, materials, elements, the arrangement and connection of the elements, steps, the order of the steps, etc., described in the following embodiments are mere examples, and are therefore not intended to limit the present disclosure. Accordingly, among elements in the following embodiments, those not appearing in any of the independent claims that indicate the broadest concepts of the present disclosure will be described as optional elements.

In the following embodiments, although there are cases where expressions, such as "parallel" and "orthogonal" and the like, describing the relative orientation of two directions are used, strictly speaking, such expressions may also be used to refer to other orientations as well. For example, when two directions are parallel to each other, unless otherwise noted, this not only refers to a state in which the two directions are completely parallel to each other, but also refers to variations in which the two directions are essentially parallel, such as those that fall within a range of deviation of a few percent. The light paths illustrated as examples in the diagrams in the following embodiments are used to illustrate fundamental concepts, and are not necessarily reflective of actual light paths.

Embodiment 1

Figure 2:
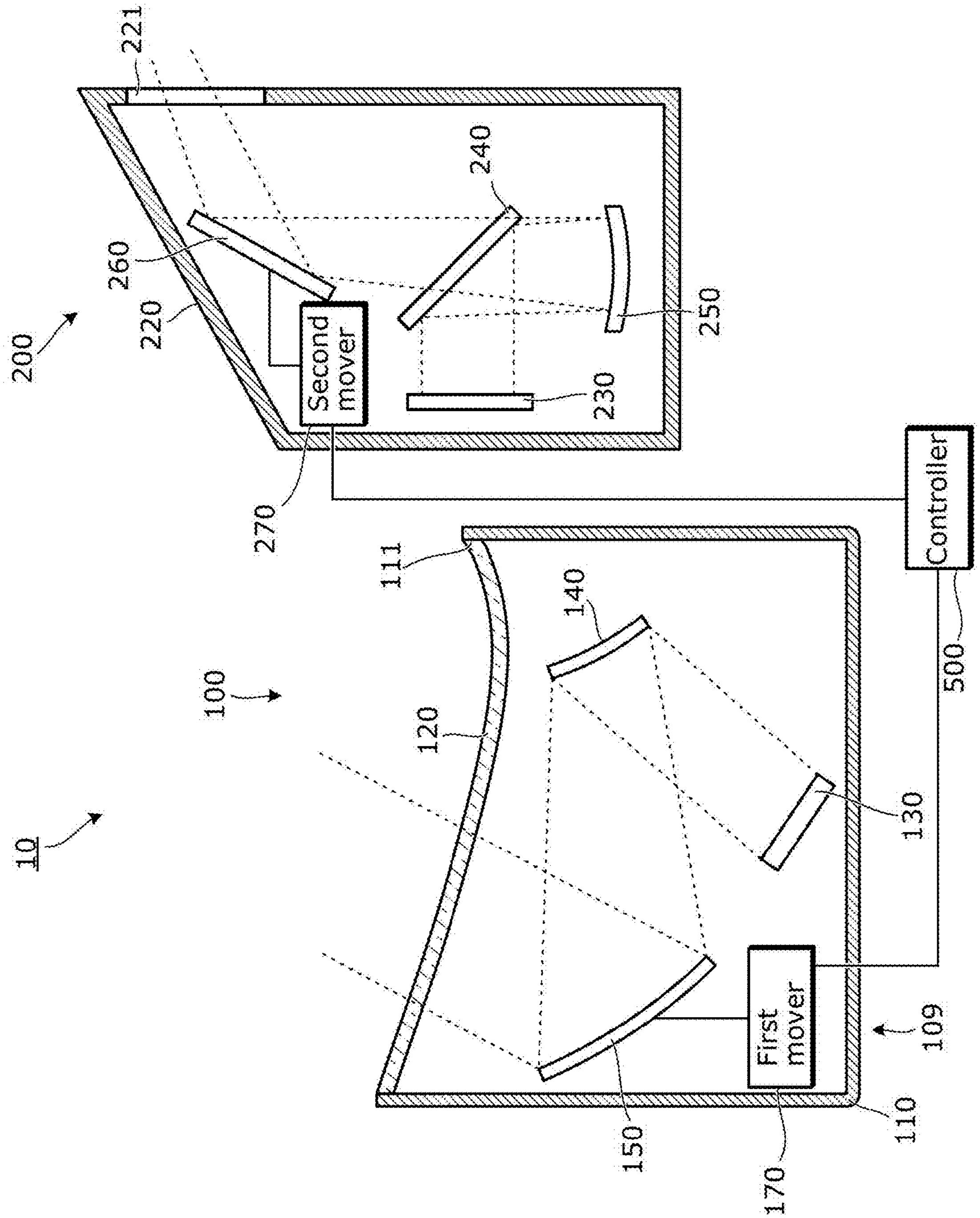
FIG. 2 is a schematic diagram illustrating a first display unit, a second display unit, and a controller that are elements of the display system according to Embodiment 1.

FIG. 1 is a schematic diagram illustrating a state in which display system 10 according to Embodiment 1 is provided in vehicle 1. FIG. 1 illustrates a cross section of vehicle 1. FIG. 2 is a schematic diagram illustrating first display unit 100, second display unit 200, and controller 500 that are elements of display system 10 according to Embodiment 1.

As illustrated in FIG. 1 and FIG. 2, display system 10 includes first display unit 100, second display unit 200, camera 600, and controller 500. First display unit 100 and second display unit 200 display vehicle information related to vehicle 1 as first virtual image 101 and second virtual image 201, for example. Examples of vehicle information include the vehicle speed of vehicle 1, the total number of revolutions of an engine, a detection result of an object near vehicle 1, navigation information from the current location of vehicle 1 to a destination, image information of the rear or surroundings of vehicle 1 captured by a vehicle external camera, and the like.

(First Display Unit)

First display unit 100 includes display device body 109 and windshield 2 (front window) that is provided in vehicle 1. Display device body 109 is an augmented reality head-up display (AR-HUD). Display device body 109 projects image light onto windshield 2 that is a display medium. The image light projected is reflected by windshield 2. The reflected light travels toward the eyes of a driver, who is a user, seated in a driver seat. In other words, windshield 2 is an example of a final reflector that reflects the image light toward the driver.

The driver perceives the reflected light that enters the eyes of the driver as first virtual image 101 that can be seen on the opposite side (vehicle external side) of windshield 2 on top of a background of objects that are visible through windshield 2. In this manner, first display unit 100 is an example of a display unit that projects a virtual image in front of the driver.

As illustrated in FIG. 2, display device body 109 includes housing 110, cover 120, display element 130, first optical element 140, second optical element 150, and first mover 170. Display element 130, first optical element 140, second optical element 150, and windshield 2 are an example of a plurality of optical components for projecting first virtual image 101. The plurality of optical components may include a holographic element.

Housing 110 is a box-shaped member that is made of a resin with light-blocking properties or metal. Specifically, housing 110 is approximately rectangular-cuboid shaped and includes opening 111 that is provided thereon on an upper portion. Opening 111 is covered by cover 120. Display element 130, first optical element 140, and second optical element 150 are housed in a space inside of housing 110 and cover 120.

Cover 120 is a curved plate-like member that is made of a resin with light-transmissive properties or glass, for example. Specifically, cover 120 has an overall shape that protrudes downward in a convex manner.

Display element 130 is, for example, a liquid crystal panel. When light is emitted from a light source not shown in the drawings, display element 130 displays an image on which first virtual image 101 is based, and emits image light of the image onto first optical element 140. Display element 130 may be an organic electroluminescent (EL) panel. Display element 130 is provided in a shape that is rectangular in a plan view, and is disposed in an orientation that is tilted relative to a horizontal plane.

First optical element 140 is disposed on a light path of the image light emitted from display element 130, and is an optical element that reflects the image light toward second optical element 150. First optical element 140 is a convex mirror that is provided in a shape that is rectangular in a plan view. First optical element 140 is disposed in an orientation that is tilted relative to a vertical plane. A reflective surface of first optical element 140 faces display element 130 and second optical element 150. In other words, the reflective surface of first optical element 140, which is a mirror surface that is a convex mirror, faces inward in housing 110, and a concave surface of first optical element 140 faces outward from housing 110.

Second optical element 150 is disposed on the light path of the image light that reaches and travels from first optical element 140, and reflects the image light reflected by first optical element 140 toward opening 111. Specifically, second optical element 150 is a concave mirror that is provided in a shape that is rectangular in a plan view. Second optical element 150 is disposed in an orientation that faces the reflective surface of first optical element 140, and is tilted relative to the vertical plane of housing 110. The reflective surface of second optical element 150 faces first optical element 140 and cover 120. In other words, the reflective surface of second optical element 150, which is a mirror surface that is a concave mirror, faces inward in housing 110, and a convex surface of second optical element 150 faces outward from housing 110. The image light reflected by second optical element 150 is projected onto windshield 2 via opening 111. Due to such reflection, the image light travels toward the eyes of the driver seated in the driver seat, thereby forming first virtual image 101. In FIG. 1, the position of first virtual image 101 as perceived from the viewpoint of the driver is illustrated. This position can be set by adjusting the viewing distance of the image light emitted from display element 130 of first display unit 100. The viewing distance is the distance from the viewpoint of the driver to the image formation position of the virtual image (first virtual image 101, for example). The viewpoint of the driver is, for example, a reference eye point. A reference eye point is "a point that is representative of the eyes of the driver during typical driving conditions".

First mover 170 is provided inside of housing 110, and adjusts a first display position in an up-and-down direction of first virtual image 101. By moving second optical element 150, first mover 170 causes the light path of the image light that forms first virtual image 101 to change, and adjusts the first display position. Specifically, first mover 170 includes a rotation mechanism and a drive motor for adjusting the orientation (inclination) of second optical element 150. Second optical element 150 has a center of rotation that is located at a central portion of the reflective surface, for example, and rotates in a clockwise or a counter-clockwise direction in a side view. This rotational movement is performed by the rotation mechanism and the drive motor provided in first mover 170. This changes the orientation of second optical element 150. By changing the orientation of second optical element 150, the light path of the image light that forms first virtual image 101 is changed, and the first display position of first virtual image 101 is adjusted in the up-and-down direction. Although a case in which first mover 170 causes second optical element 150 to rotationally move is described as an example in the present embodiment, a sliding movement may be performed instead. A sliding movement is movement in a direction of at least one of the up-and-down direction, a front-and-back direction, an optical axial direction, or the like. The rotational movement may be combined with the sliding movement. Furthermore, first mover 170 may move an optical component other than second optical element 150 that is included in display device body 109.

(Second Display Unit)

As illustrated in FIG. 1, second display unit 200 projects image light toward the driver. The driver perceives the image light that enters the eyes of the driver as second virtual image 201 that is visible at a position far from opening 221 (see FIG. 2) of the second display unit. In this manner, second display unit 200 is an example of a display unit that projects a virtual image in front of the driver. Specifically, second display unit 200 projects second virtual image 201 toward a position that is in front of the driver and below first virtual image 101. Accordingly, a depression angle of the line of sight of the driver relative to second virtual image 201 is larger than a depression angle of the line of sight of the driver relative to first virtual image 101.

As illustrated in FIG. 2, second display unit 200 includes housing 220, display element 230, polarizing half mirror 240, first mirror 250, second mirror 260, and second mover 270. Display element 230, polarizing half mirror 240, first mirror 250, and second mirror 260 are an example of a plurality of optical components for projecting second virtual image 201. The plurality of optical components may include a holographic element.

Housing 220 is a box-shaped member that is made of a resin with light-blocking properties or metal. Opening 221 that faces rearward is provided on an upper end of the back of housing 220 ("the back" and "the rear" are defined as the rightward direction in FIG. 2). Image light that forms second virtual image 201 is projected from opening 221. Display element 230, polarizing half mirror 240, first mirror 250, and second mirror 260 are housed in a space inside of housing 220.

Display element 230 is, for example, a liquid crystal panel. When light is emitted from a light source not shown in the drawings, display element 230 displays an image on which second virtual image 201 is based, and emits image light of the image onto polarizing half mirror 240. Display element 230 may be an organic EL panel. Display element 230 is provided in an orientation in which a display surface of display element 230 faces rearward. Although detailed illustration has been omitted, a λ/4 retardation plate (hereinafter abbreviated as a "λ/4 plate") is stacked on the display surface of display element 230. A λ/4 plate is a λ/4 retardation plate that introduces a phase difference of ¼ of wave λ into light that enters the λ/4 plate. For example, when light emitted from the display surface is S-polarization linearly polarized light, by allowing it to pass through the λ/4 plate, the light is thus converted to circularly polarized light.

Polarizing half mirror 240 is configured to reflect P-polarized light and to allow S-polarized light to pass through, and is provided with a reflective polarization plate in a glass substrate that is plate shaped. Furthermore, a λ/4 plate is stacked on a surface of polarizing half mirror 240. Polarizing half mirror 240 is provided in an orientation facing toward display element 230 and first mirror 250. The S-polarized image light emitted from display element 230 is converted into circularly polarized light by the λ/4 plate stacked on display element 230, and travels toward polarizing half mirror 240. The image light that is circularly polarized light is converted to P-polarized light by the λ/4 plate stacked on polarizing half mirror 240, and is reflected by the reflective polarization plate of polarizing half mirror 240. The P-polarized image light that is reflected is converted to circularly polarized light by once again passing through a λ/4 plate. Consequently, polarizing half mirror 240 is disposed in an orientation in which the image light that was incident as circularly polarized light is reflected as circularly polarized light toward first mirror 250 by the λ/4 plate stacked on polarizing half mirror 240 and the reflective polarization plate.

First mirror 250 is a concave mirror, and is disposed below polarizing half mirror 240 in FIG. 2. First mirror 250 is disposed in an orientation in which a concave surface of first mirror 250, which is a reflective surface, faces upward. The image light that is circularly polarized light reflected by polarizing half mirror 240 remains as circularly polarized light while being reflected by first mirror 250, and once again travels toward polarizing half mirror 240. The image light that is incident on polarizing half mirror 240 is converted to S-polarized light by the λ/4 plate stacked on polarizing half mirror 240, passes through the reflective polarization plate of polarizing half mirror 240, and proceeds to travel upward in FIG. 2.

Second mirror 260 is a flat mirror, and is disposed above polarizing half mirror 240. Accordingly, the image light that passes through polarizing half mirror 240 and travels upward is reflected by second mirror 260. Second mirror 260 is disposed in an orientation to reflect the image light toward opening 221. The image light reflected by second mirror 260 travels toward the eyes of the driver seated in the driver seat, via opening 221, thereby forming second virtual image 201. In other words, second mirror 260 is an example of a final reflector that reflects the image light toward the driver.

As described earlier, the depression angle of the line of sight of the driver relative to second virtual image 201 is larger than a depression angle of the line of sight of the driver relative to first virtual image 101. In other words, first virtual image 101 is disposed closer to directly in front of the driver than second virtual image 201. Accordingly, when first virtual image 101 is bright, the field of view of the driver is more likely to become obstructed. In order to prevent this, the reflectance of second mirror 260 is set to be higher than the reflectance of windshield 2. Accordingly, first virtual image 101 that is formed by the image light reflected by windshield 2 is displayed in a manner that is fainter than second virtual image 201 that is formed by the image light reflected by second mirror 260. Accordingly, the brightness of the forward field of view of the driver is ensured.

In second display unit 200, the light path of the image light from display element 230 to second mirror 260 is provided inside of housing 220. Accordingly, the above-mentioned light path is spatially independent of the light path of the image light from display element 130 to windshield 2 in first display unit 100.

In FIG. 1, the position of second virtual image 201 as viewed from the viewpoint of the driver is illustrated. This position can be set by adjusting the viewing distance of the image light emitted by display element 230 of second display unit 200.

Second mover 270 is provided in housing 220 of second display unit 200, and adjusts a second display position in an up-and-down direction of second virtual image 201. Second mover 270 changes the light path of the image light that forms second virtual image 201 by moving second mirror 260, and adjusts the second display position. Specifically, second mover 270 includes a rotation mechanism and a drive motor for adjusting the orientation (inclination) of second mirror 260. Second mirror 260 has a center of rotation that is located at a central portion of the reflective surface, for example, and rotates in a clockwise or a counter-clockwise direction in a side view. This rotational movement is performed by the rotation mechanism and drive motor provided in second mover 270. This changes the orientation of second mirror 260. By changing the orientation of second mirror 260, the light path of the image light that forms second virtual image 201 is changed, and the second display position of second virtual image 201 is adjusted in the up-and-down direction. Although a case in which second mover 270 causes second mirror 260 to rotationally move is described as an example in the present embodiment, a sliding movement may be performed instead. A sliding movement is movement in a direction of at least one of the up-and-down direction, a front-and-back direction, an optical axial direction, or the like. If a sliding movement is performed on the optical axis, it is also possible to adjust the viewing distance of second virtual image 201. The rotational movement may be combined with the sliding movement. Furthermore, second mover 270 may move an optical component other than second mirror 260 that is included in second display unit 200.

(Camera)

As illustrated in FIG. 1, camera 600 is disposed in the vicinity of an upper portion of windshield 2 inside of vehicle 1, and captures images of the head of the driver and the interior of the vehicle cabin. In other words, images captured by camera 600 include feature points of the head of the driver and feature points of the interior of the vehicle cabin.

(Controller)

As illustrated in FIG. 1, controller 500 is electrically connected to and controls first display unit 100, second display unit 200, and camera 600. Specifically, controller 500 includes a computer processing unit (CPU), a random-access memory (RAM), a read-only memory (ROM), and the like, and each process is executed by the CPU deploying a program stored in ROM to RAM and executing the program.

Controller 500 obtains an image captured by camera 600 and estimates the viewpoint position of the driver from the image captured. Specifically, by performing predetermined image processing on the image captured, controller 500 extracts each of the feature points of the head of the driver and each of the feature points of the interior of the vehicle cabin. Controller 500 estimates the viewpoint position (coordinate values of a viewpoint position in at least one of the front-and-back direction, the up-and-down direction, and the vehicle-width direction) of the driver based on each of the feature points of the head and each of the feature points of the interior of the vehicle cabin. In this manner, controller 500 is an example of a viewpoint estimator that estimates the viewpoint position of the driver.

Furthermore, controller 500 also functions as an adjuster that adjusts each of the first display position of first virtual image 101 and the second display position of second virtual image 201 based on an estimation result. Specifically, by controlling first mover 170 and second mover 270 based on the estimation result, controller 500 adjusts at least one of the first display position or the second display position. Accordingly, this control can adjust at least one of the first display position or the second display position to be positioned in accordance with the viewpoint position of the driver.

Here, controller 500 may add, to the image displayed by the display element, distortion of an amount that is based on an adjustment amount of the display position. For example, after determining the adjustment amount for the first display position, controller 500 adds distortion of an amount that is based on the adjustment amount to the image displayed by display element 130. In the same manner, after determining the adjustment amount for the second display position, controller 500 adds distortion of an amount that is based on the adjustment amount to the image displayed by display element 230. Consequently, images are displayed by display element 130 and display element 230, in which such post-adjustment distortion of virtual image 101 and second virtual image 201 that may occur is taken into account in advance. Consequently, after adjustment has been performed, the distortion of first virtual image 101 and the distortion of second virtual image 201 are canceled out, thereby making the appearance of first virtual image 101 and second virtual image 201 less likely to change before and after adjustment, and making it less likely that the driver will experience a sense of unnaturalness.

(Adjustment of First Display Position and Second Display Position)

Hereinafter, the difference between first virtual image 101 and second virtual image 201 before and after adjustment of the first display position and the second display position will be specifically described in detail.

Figure 3:
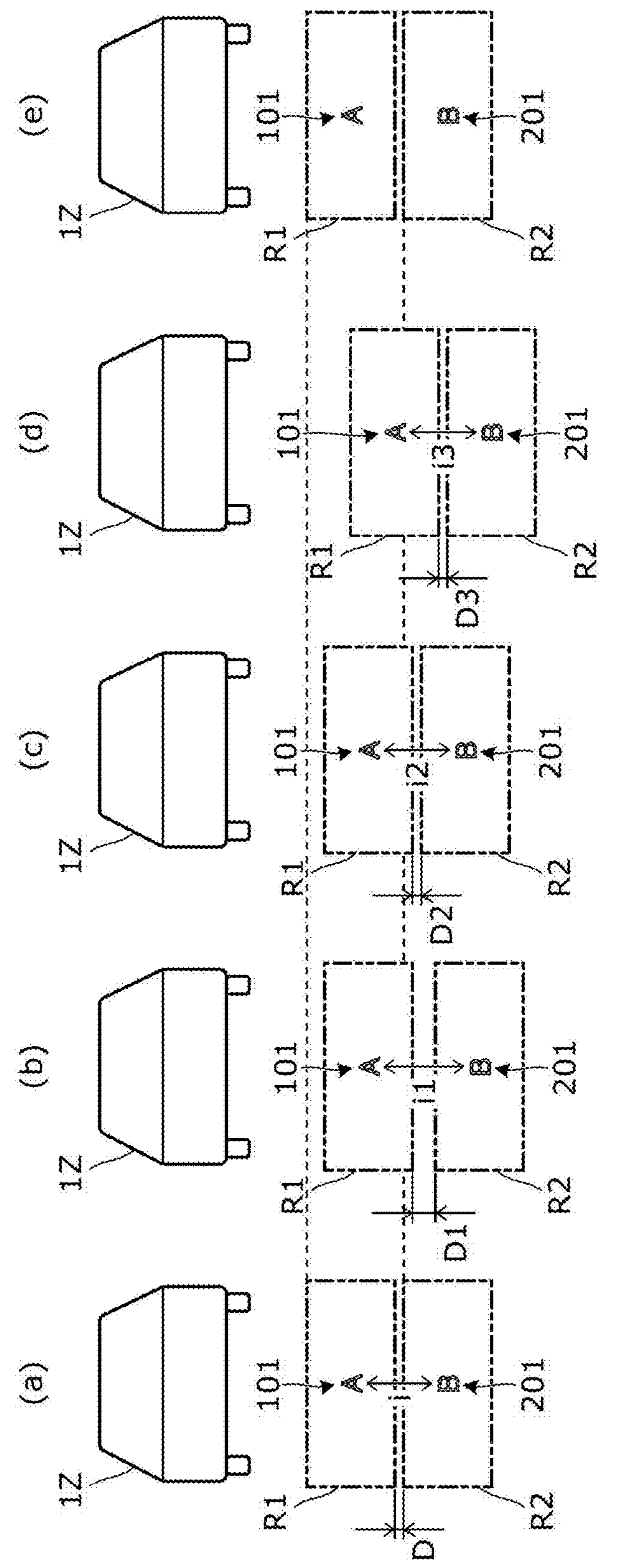
FIG. 3 is a diagram for describing a first virtual image and a second virtual image before and after adjustment has been performed according to Embodiment 1.

FIG. 3 is a diagram for describing first virtual image 101 and second virtual image 201 before and after adjustment has been performed according to Embodiment 1. In FIG. 3, a state is illustrated in which leading vehicle 1Z that is in front of vehicle 1 is viewed from vehicle 1, which is the driver's own vehicle. In FIG. 3, first virtual image 101 is indicated as "A", and second virtual image 201 is indicated as "B". Furthermore, in FIG. 3, first displayable range R1 of first virtual image 101 and second displayable range R2 of second virtual image 201 are indicated with double-dotted lines. A displayable range is a range in which a virtual image can be displayed. For example, first displayable range R1 is dependent on the display region of display element 130, and second displayable range R2 is dependent on the display region of display element 230. First displayable range R1 corresponds to the first display position and second displayable range R2 corresponds to the second display position.

(a) in FIG. 3 illustrates first virtual image 101 and second virtual image 201 before adjustment is performed. (a) in FIG. 3 illustrates a case in which a driver who is small in stature is viewing a forward area in front of vehicle 1. As illustrated in (a) in FIG. 3, first virtual image 101 and second virtual image 201 are arranged in an up-and-down direction such that first virtual image 101 is positioned upward and second virtual image 201 is positioned downward. A lower edge of first displayable range R1 of first virtual image 101 and an upper edge of second displayable range R2 of second virtual image 201 are arranged so as to be spaced apart by distance D. First virtual image 101 and second virtual image 201 are arranged so as to be spaced apart by distance i.

(b) in FIG. 3 illustrates a state before adjustment is performed in a case in which a driver who is small in stature switches with a driver who is large in stature. Since the viewpoint position becomes higher by switching to a driver who is large in stature, first virtual image 101 and second virtual image 201 as viewed by the driver who is large in stature appear to be positioned lower than the case in (a) in FIG. 3. Furthermore, distance D1, which is the space between the lower edge of first displayable range R1 and the upper edge of second displayable range R2, is larger than distance D. Accordingly, distance i1, which is the space between first virtual image 101 and second virtual image 201, becomes larger than distance i.

Controller 500 obtains an image captured by camera 600 and estimates the viewpoint position of the driver from the image captured, and by controlling first mover 170 and second mover 270 based on the estimation result, controller 500 adjusts at least one of the first display position or the second display position.

(c) in FIG. 3 illustrates a case in which only the second display position (second displayable range R2) has been adjusted. In this case, first displayable range R1 is the same as indicated in (b) in FIG. 3, and second displayable range R2 is positioned higher than second displayable range R2 indicated in (b) in FIG. 3. Here, distance D2, which is the space between the lower edge of first displayable range R1 and the upper edge of second displayable range R2 after adjustment has been performed, preferably falls within a predetermined range. The predetermined range is 30 percent or less of the difference between distance D1 and distance D, and furthermore, is even more preferably 20 percent or less of the difference. In this manner, since it is possible to keep distance D2, which is the space between the lower edge of first displayable range R1 and the upper edge of second displayable range R2, within the predetermined range, distance i2, which is the space between first virtual image 101 and second virtual image 201, can also be made to be small. Distance i2 preferably falls within a predetermined interval. The predetermined interval is preferably 30 percent or less of the difference between distance i1 and distance i, and furthermore, is even more preferably 20 percent or less of the difference.

Accordingly, first virtual image 101 and second virtual image 201 can be displayed in a compact manner in the up-and-down direction, thereby making it possible to enhance visibility of first virtual image 101 and second virtual image 201 to the user.

(d) in FIG. 3 illustrates a case in which only the first display position (first displayable range R1) has been adjusted. In this case, second displayable range R2 is the same as indicated in (b) in FIG. 3, and first displayable range R1 is positioned lower than first displayable range R1 indicated in (b) in FIG. 3. Here, in the same manner as for distance D2, distance D3, which is the space between the lower edge of first displayable range R1 and the upper edge of second displayable range R2 after adjustment has been performed, preferably falls within the predetermined range. Distance i3, which is the space between first virtual image 101 and second virtual image 201, preferably falls within the predetermined interval.

(e) in FIG. 3 illustrates a case in which the first display position and the second display position have both been adjusted. In this case, second displayable range R2 is positioned higher than second displayable range R2 indicated in (b) in FIG. 3, and first displayable range R1 is positioned higher than first displayable range R1 indicated in (b) in FIG. 3. In particular, in (e) in FIG. 3, both first displayable range R1 and second displayable range R2 are respectively positioned in positions that are equivalent to first displayable range R1 and second displayable range R2 in (b) in FIG. 3. Accordingly, even when the driver is large in stature, first displayable range R1 and second displayable range R2 can be positioned in a field of view that is the same as that of a driver who is small in stature.

(Advantageous Effects, Etc.)

As described above, according to the present embodiment, controller 500 adjusts the display position of at least one virtual image among the plurality of virtual images based on the viewpoint position of the driver estimated. With this adjustment, positional misalignment of the plurality of virtual images that results from variation in the viewpoint position of the driver can be suppressed. Furthermore, since the final reflector of first display unit 100 (windshield 2) and the final reflector of second display unit 200 (second mirror 260) are provided as separate units, when compared to a case in which a common final reflector is used, the degree of freedom in designing the optical configuration inside first display unit 100 and second display unit 200 can be increased, and the optical configuration can be made more compact. In other words, it is possible to limit the overall size of display system 10. As a result, display system 10 whose size can be limited while suppressing positional misalignment of a plurality of virtual images can be provided.

Furthermore, since controller 500 adjusts the first display position of first virtual image 101 and the second display position of second virtual image 201, the relative positional misalignment between first virtual image 101 and second virtual image 201 can be more finely suppressed.

Furthermore, since controller 500 adjusts at least one of the first display position or the second display position to cause distance i2 and distance i3 between first virtual image 101 and second virtual image 201 to fall within a predetermined interval, distance i2 and distance i3 can be made to be smaller than the predetermined interval. Accordingly, first virtual image 101 and second virtual image 201 can be displayed in a compact manner, thereby making it possible to enhance visibility of first virtual image 101 and second virtual image 201 to the driver.

Furthermore, controller 500 adjusts at least one of the first display position or the second display position to cause distance D2 and distance D3 between a lower edge of first displayable range R1 and an upper edge of second displayable range R2 to fall within a predetermined range. Accordingly, first virtual image 101 and second virtual image 201 can be displayed in an up-and-down direction in a compact manner. Consequently, when the driver views first virtual image 101 and second virtual image 201, since movement of the line of sight in the up-and-down direction is inhibited, visibility in the left-and-right direction can be enhanced.

Furthermore, since controller 500 controls first mover 170 and second mover 270, and adjusts the first display position and the second display position, the first display position and the second display position can be adjusted by first mover 170 and second mover 270 while keeping positions of images in display element 130 and display element 230 constant.

Furthermore, since controller 500 estimates the viewpoint position of the driver based on the image captured by camera 600, by using the image captured, the viewpoint position can be estimated with a high degree of accuracy. Consequently, positional misalignment of first virtual image 101 and second virtual image 201 can be more accurately suppressed.

Furthermore, a reflectance of a final reflector (second mirror 260) that forms second virtual image 201, which has a depression angle that is larger than a depression angle of first virtual image 101, is larger than a reflectance of a final reflector (windshield 2) that forms first virtual image 101. In other words, although first virtual image 101, which has a depression angle that is smaller than the depression angle of second virtual image 201, is positioned directly in front of the driver, since the reflectance of the final reflector that forms first virtual image 101 is smaller than the reflectance of the final reflector that forms second virtual image 201, the brightness of the forward field of view of the driver is ensured.

Here, when the final reflector that forms each of the virtual images is the same, as seen in conventional techniques, the final reflector is divided into a plurality of final reflectors, and processing needs to be performed to cause each section to have a different reflectance. In the present embodiment, since separate components are provided as the final reflectors that form each of the virtual images, components that each have an appropriate reflectance may be used. In other words, the above-mentioned processing becomes unnecessary, and manufacturing efficiency can be enhanced.

Furthermore, each of first display unit 100 and second display unit 200 are arranged to cause light paths from display element 130 and display element 230 to the final reflectors (windshield 2, second mirror 260) to be spatially independent of each other. In other words, since the light paths of first display unit 100 and second display unit 200 are spatially independent of each other, maintenance can be simplified.

Furthermore, by controlling first mover 170 and second mover 270, controller 500 adjusts viewing distances of first virtual image 101 and second virtual image 201 by adjusting the first display position and the second display position. Accordingly, a scaling factor of first virtual image 101 and second virtual image 201 can be changed, and the degree of freedom of the display presentation is enhanced.

Since display element 130 and display element 230 add, to the images, distortion of amounts that are based on adjustment amounts of the first display position and the second display position, images are displayed by display element 130 and display element 230, in which such post-adjustment distortion of first virtual image 101 and second virtual image 201 that may occur is taken into account in advance. Consequently, first virtual image 101 and second virtual image 201 based on the above-mentioned images can be displayed in a state in which distortion is suppressed.

Embodiment 2

Figure 4:
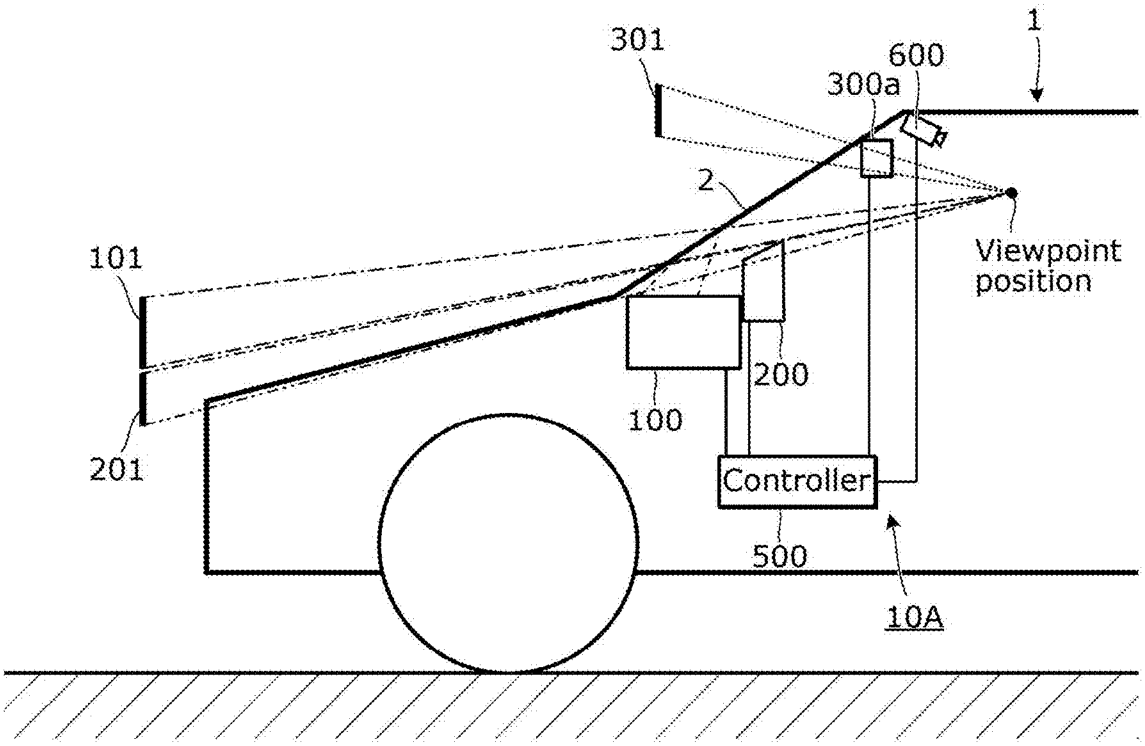
FIG. 4 is a schematic diagram illustrating a state in which a display system according to Embodiment 2 is provided in the vehicle.

In the following descriptions, portions that are the same as that of Embodiment 1 are given the same reference signs and descriptions thereof may be omitted. In the above-mentioned embodiment, an example is described of a case involving two display units. However, three or more display units may be provided. FIG. 4 is a schematic diagram illustrating a state in which display system 10A according to Embodiment 2 is provided in vehicle 1. FIG. 4 is a diagram that corresponds to FIG. 1. As illustrated in FIG. 4, display system 10A according to Embodiment 2 differs from Embodiment 1 in that third display 300*a* is added.

Third display 300*a* is an electronic mirror-type display device, and is disposed in an upper central portion of windshield 2 in the interior of the vehicle cabin. Here, a rear camera (not illustrated in the figures) that captures an image of an area behind vehicle 1 is provided in display system 10A. Third display 300*a* projects third virtual image 301 that is based on a rear image captured by the rear camera.

Specifically, third display 300*a* projects image light toward the driver. The driver perceives the image light that enters the eyes of the driver as third virtual image 301 that is visible at a position far from opening 321 (see FIG. 5) of third display unit 300*a*. In this manner, third display unit 300*a* is an example of a display unit that projects a virtual image in front of the driver. Specifically, third display unit 300*a* projects third virtual image 301 toward a position that is in front of the driver and above first virtual image 101. Accordingly, when viewed by the driver, in order from the top, third virtual image 301, first virtual image 101, and second virtual image 201 are arranged in an up-and-down direction in the stated order. An absolute value of an elevation angle of the line of sight of the driver relative to third virtual image 301 is larger than an absolute value of a depression angle of the line of sight of the driver relative to first virtual image 101.

Figure 5:
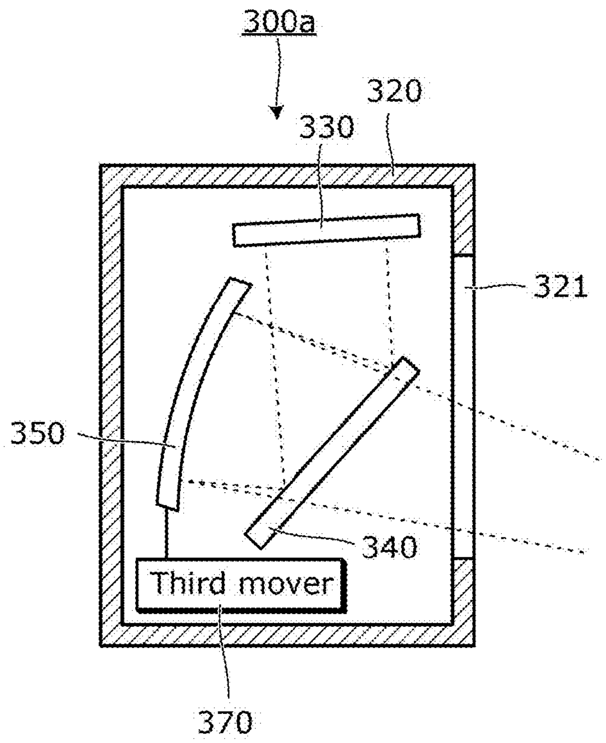
FIG. 5 is a schematic diagram illustrating a third display unit according to Embodiment 2.

FIG. 5 is a schematic diagram illustrating third display unit 300*a* according to Embodiment 2. As illustrated in FIG. 5, third display unit 300*a* includes housing 320, display element 330, polarizing half mirror 340, concave mirror 350, and third mover 370. Display element 330, polarizing half mirror 340, and concave mirror 350 are an example of a plurality of optical components for projecting third virtual image 301. The plurality of optical components may include a holographic element.

Housing 320 is a box-shaped member that is made of a resin with light-blocking properties or metal. Opening 321 that faces rearward is provided on the back of housing 320 ("the back" and "the rear" are defined as the rightward direction in FIG. 5). Image light that forms third virtual image 301 is projected from opening 321. Display element 330, polarizing half mirror 340, concave mirror 350, and third mover 370 are housed in a space inside of housing 320. Display element 330 and third mover 370 are controlled by controller 500.

Display element 330 is, for example, a liquid crystal panel. When light is emitted from a light source not shown in the drawings, display element 330 displays an image on which third virtual image 301 is based, and emits image light of the image onto polarizing half mirror 340. Display element 330 may be an organic EL panel. Display element 330 is provided in an orientation in which a display surface of display element 330 faces downward. Although detailed illustration has been omitted, a λ/4 plate is stacked on the display surface of display element 330. A λ/4 plate is a λ/4 retardation plate that introduces a phase difference of ¼ of wave λ into light that enters the λ/4 plate. For example, when light emitted from the display surface is S-polarization linearly polarized light, by allowing it to pass through the λ/4 plate, the light is thus converted to circularly polarized light.

Polarizing half mirror 340 is configured to reflect P-polarized light and to allow S-polarized light to pass through, and is provided with a reflective polarization plate in a glass substrate that is plate shaped. Furthermore, a λ/4 plate is stacked on a surface of polarizing half mirror 340. Polarizing half mirror 340 is provided in an orientation facing toward display element 330 and concave mirror 350. The S-polarized image light emitted by display element 330 is converted into circularly polarized light by the λ/4 plate stacked on display element 330, and travels toward polarizing half mirror 340. The image light that is circularly polarized light is converted to P-polarized light by the λ/4 plate stacked on polarizing half mirror 340, and is reflected by the reflective polarization plate of polarizing half mirror 340. The P-polarized image light that is reflected is converted to circularly polarized light by once again passing through a λ/4 plate. Consequently, polarizing half mirror 340 is disposed in an orientation in which the image light that was incident as circularly polarized light is reflected as circularly polarized light toward concave mirror 350 by the λ/4 plate stacked on polarizing half mirror 340 and the reflective polarization plate.

Concave mirror 350 is disposed in front of polarizing half mirror 340. Concave mirror 350 is disposed in an orientation in which a concave surface of concave mirror 350, which is a reflective surface, faces rearward. The image light that is circularly polarized light reflected by polarizing half mirror 340 remains as circularly polarized light while being reflected by concave mirror 350, and once again travels toward polarizing half mirror 340. The image light that is incident on polarizing half mirror 340 is converted to S-polarized light by the λ/4 plate stacked on polarizing half mirror 340, passes through the reflective polarization plate of polarizing half mirror 340, and proceeds to travel rearward in FIG. 5. This image light travels toward the eyes of the driver seated in the driver seat, via opening 321, thereby forming third virtual image 301. In other words, concave mirror 350 is an example of a final reflector that reflects the image light toward the driver.

As described earlier, an absolute value of an elevation angle of the line of sight of the driver relative to third virtual image 301 is larger than an absolute value of a depression angle of the line of sight of the driver relative to first virtual image 101. In other words, first virtual image 101 is disposed closer to directly in front of the driver than third virtual image 301. Accordingly, when first virtual image 101 is bright, the field of vision of the driver is more likely to become obstructed. In order to prevent this, the reflectance of concave mirror 350 is set to be higher than the reflectance of windshield 2. Accordingly, first virtual image 101 that is formed by the image light reflected by windshield 2 is displayed in a manner that is fainter than third virtual image 301 that is formed by the image light reflected by concave mirror 350. Accordingly, the brightness of the forward field of view of the driver is ensured.

In third display unit 300*a*, the light path of the image light from display element 330 to concave mirror 350 is provided inside of housing 320. Accordingly, the above-mentioned light path is spatially independent from the light path of the image light from display element 130 to windshield 2 in first display unit 100.

In FIG. 4, the position of third virtual image 301 as viewed from the viewpoint of the driver is illustrated. This position can be set by adjusting the viewing distance of the image light emitted by display element 330 of third display unit 300*a*.

Third mover 370 illustrated in FIG. 5 is provided in housing 320 of third display unit 300*a* and adjusts a third display position in an up-and-down direction of third virtual image 301. Third mover 370 changes the light path of the image light that forms third virtual image 301 by moving concave mirror 350, and adjusts the third display position. Specifically, third mover 370 includes a rotation mechanism and a drive motor for adjusting the orientation (inclination) of concave mirror 350. Concave mirror 350 has a center of rotation that is located at a central portion of the reflective surface, for example, and rotates in a clockwise or a counter-clockwise direction in a side view. This rotational movement is performed by the rotation mechanism and drive motor provided in third mover 370. This changes the orientation of concave mirror 350. By changing the orientation of concave mirror 350, the light path of the image light that forms third virtual image 301 is changed, and the third display position of third virtual image 301 is adjusted in the up-and-down direction.

By controlling first mover 170, second mover 270, and third mover 370 based on the viewpoint position estimated, controller 500 adjusts at least one of the first display position, the second display position, or the third display position. Accordingly, this control can adjust at least one of the first display position, the second display position, or the third display position to be positioned in accordance with the viewpoint position of the driver. Controller 500 may adjust all of the first display position, the second display position, and the third display position to cause them to be positioned in accordance with the viewpoint position of the driver.

As described above, even in a case in which first display unit 100, second display unit 200, and third display unit 300*a* are provided, a display system 10A with a limited size can be provided in which misalignment can be suppressed for at least one of first virtual image 101, second virtual image 201, or third virtual image 301. It should be noted that four or more display units may be provided. In any case, although it may be sufficient if controller 500 adjusts the display position of at least one of the virtual images projected by the display units to coincide with a position that is in accordance with the viewpoint position of the driver, controller 500 may adjust the display positions of all of the virtual images.

Embodiment 3

Figure 6:
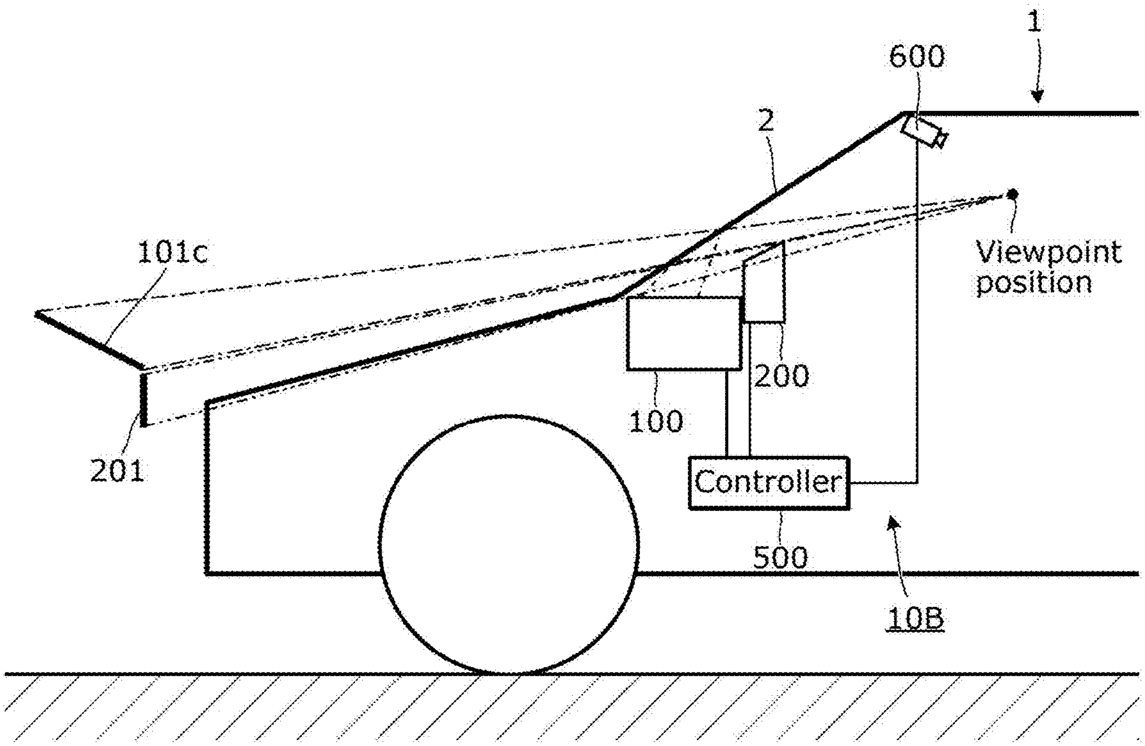
FIG. 6 is a schematic diagram illustrating a state in which a display system according to Embodiment 3 is provided in the vehicle.

FIG. 6 is a schematic diagram illustrating a state in which display system 10B according to Embodiment 3 is provided in vehicle 1. FIG. 6 is a diagram that corresponds to FIG. 1. In FIG. 6, the viewing distance relative to a lower edge of first virtual image 101*c* is shorter than the viewing distance relative to an upper edge of first virtual image 101*c*. Here, first mover 170 provided in first display unit 100 is capable of changing the orientation of display element 130, which is an example of an optical component. By controlling first mover 170 and changing the orientation of display element 130, controller 500 can also change the orientation of first virtual image 101*c*. Controller 500 may change the orientation of first virtual image 101*c* based on a viewpoint position estimated.

In this manner, since controller 500 causes the viewing distance relative to the lower edge of first virtual image 101*c* to be shorter than the viewing distance relative to the upper edge of first virtual image 101*c*, first virtual image 101*c* can be displayed in a manner that more naturally evokes a perception of depth for the driver. Note that a similar configuration may also be added for the other display units.

Embodiment 4

In Embodiment 4, a case will be described in which controller 500 adjusts a coordinate position of an image inside of a display element to adjust a display position of a virtual image.

Figure 7:
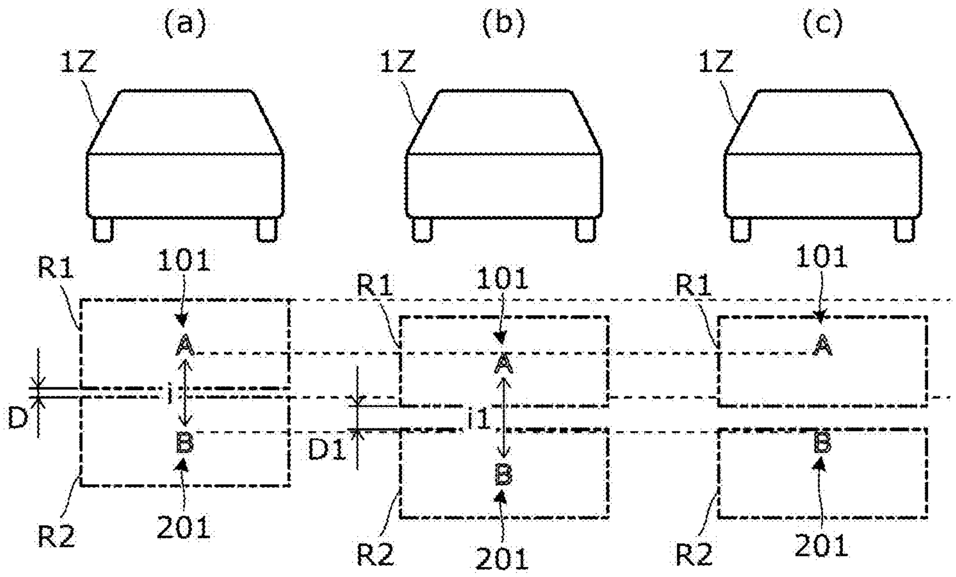
FIG. 7 is a diagram for describing a first virtual image and a second virtual image before and after adjustment has been performed according to Embodiment 4.

FIG. 7 is a diagram for describing first virtual image 101 and second virtual image 201 before and after adjustment has been performed according to Embodiment 4. FIG. 7 is a diagram that corresponds to FIG. 3.

(a) in FIG. 7 illustrates first virtual image 101 and second virtual image 201 before adjustment is performed. (a) in FIG. 7 illustrates a case in which a driver who is small in stature is viewing a forward area in front of vehicle 1. A lower edge of first displayable range R1 of first virtual image 101 and an upper edge of second displayable range R2 of second virtual image 201 are arranged so as to be spaced apart by distance D. First virtual image 101 and second virtual image 201 are arranged so as to be spaced apart by distance i.

(b) in FIG. 7 illustrates a state before adjustment is performed in a case in which a driver who is small in stature switches with a driver who is large in stature. Since the viewpoint position becomes higher by switching to a driver who is large in stature, first virtual image 101 and second virtual image 201 as viewed by the driver who is large in stature appear to be positioned lower than the case in (a) in FIG. 7. Furthermore, distance D1, which is the space between the lower edge of first displayable range R1 and the upper edge of second displayable range R2, is larger than distance D. Accordingly, distance i1, which is the space between first virtual image 101 and second virtual image 201, becomes larger than distance i.

Controller 500 obtains an image captured by camera 600 and estimates the viewpoint position of the driver from the image captured. Controller 500 adjusts a coordinate position of an image inside of display element 130 and display element 230 to adjust the first display position of first virtual image 101 and the second display position of second virtual image 201 based on the estimation result. (c) in FIG. 7 illustrates a state after adjustment has been performed.

Specifically, as illustrated in FIG. 7, controller 500 adjusts the coordinate position of the image inside of display element 130 to cause first virtual image 101 to be displayed in the first display position that is shown in (a) in FIG. 7 within first displayable range R1 without changing first displayable range R1. In the same manner, controller 500 adjusts the coordinate position of the image inside of display element 230 to cause second virtual image 201 to be displayed in the second display position that is shown in (a) in FIG. 7 within second displayable range R2 without changing second displayable range R2.

As described above, since controller 500 adjusts the coordinate position of the image inside of display element 130 and display element 230 to adjust the first display position and the second display position, there is no need to change first displayable range R1 or second displayable range R2. In other words, it is possible to omit the movers (first mover 170 and second mover 270). It should be noted that adjustment of display positions performed by movers and adjustment of display positions performed using coordinate positions may be combined with each other.

Embodiment 5

Figure 8:
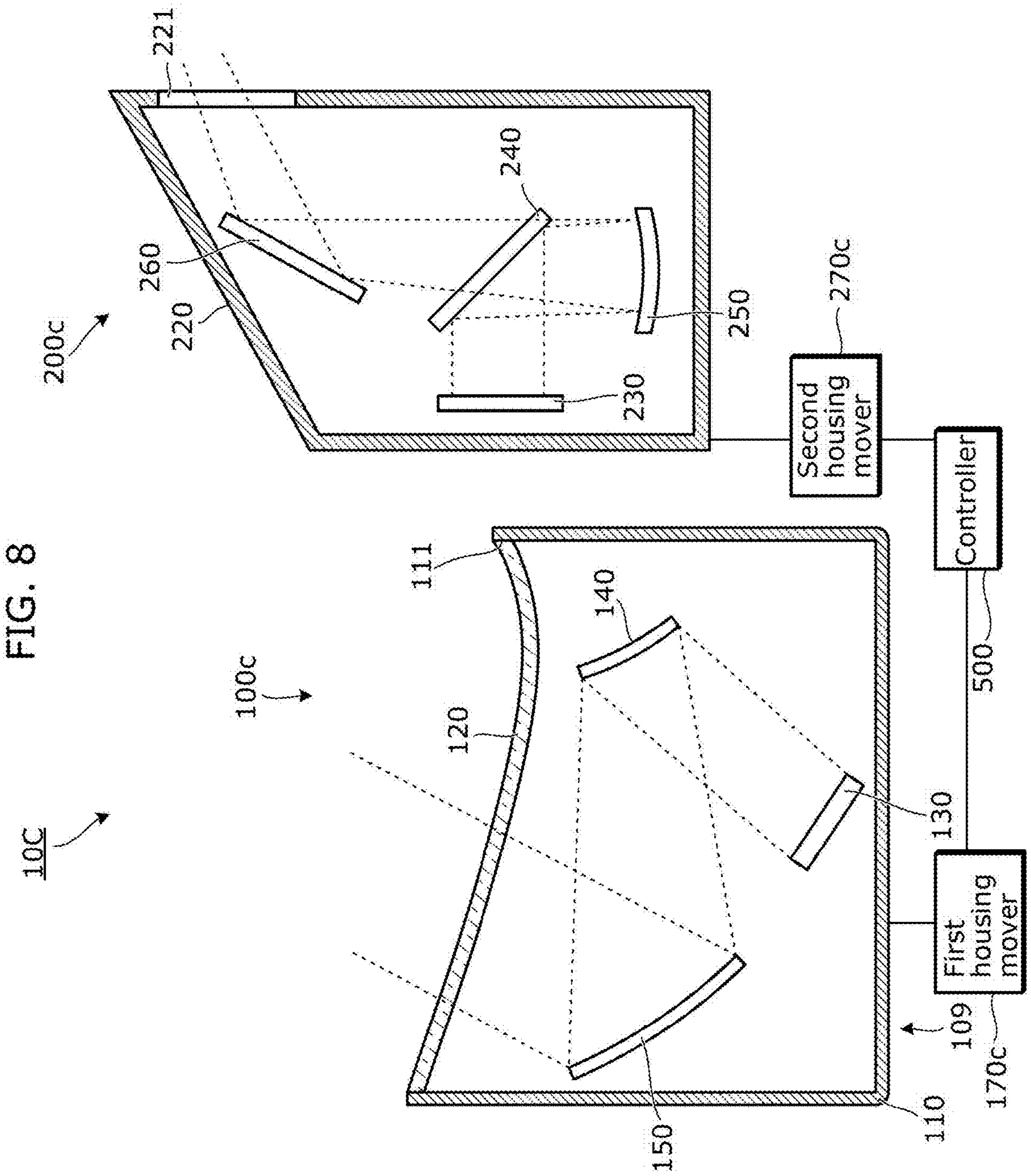
FIG. 8 is a schematic diagram illustrating a first display unit, a second display unit, and a controller that are elements of a display system according to Embodiment 5.

FIG. 8 is a schematic diagram illustrating first display unit 100*c*, second display unit 200*c*, and controller 500 that are elements of display system 10C according to Embodiment 5. FIG. 8 is a diagram that corresponds to FIG. 2.

As illustrated in FIG. 8, first display unit 100*c* includes first housing mover 170*c* that moves housing 110. First housing mover 170*c* changes the light path of the image light that forms first virtual image 101 by moving housing 110, and adjusts the first display position. Specifically, first housing mover 170*c* includes a rotation mechanism and a drive motor for adjusting the orientation (inclination) of housing 110. Housing 110 rotates in a clockwise or a counter-clockwise direction in a side view. This rotational movement is performed by the rotation mechanism and drive motor provided in first housing mover 170*c*. This changes the orientation of housing 110. By changing the orientation of housing 110, the light path of the image light that forms first virtual image 101 is changed, and the first display position of first virtual image 101 is adjusted in the up-and-down direction.

Second display unit 200*c* includes second housing mover 270*c* that moves housing 220. Second housing mover 270*c* changes the light path of the image light that forms second virtual image 201 by moving housing 220, and adjusts the second display position. Specifically, second housing mover 270*c* includes a rotation mechanism and a drive motor for adjusting the orientation (inclination) of housing 220. Housing 220 rotates in a clockwise or a counter-clockwise direction in a side view. This rotational movement is performed by the rotation mechanism and drive motor provided in second housing mover 270*c*. This changes the orientation of housing 220. By changing the orientation of housing 220, the light path of the image light that forms second virtual image 201 is changed, and the second display position of second virtual image 201 is adjusted in the up-and-down direction.

Specifically, controller 500 controls first housing mover 170*c* and second housing mover 270*c* based on the viewpoint position estimated, and adjusts the first display position and the second display position. In this manner, since controller 500 controls first housing mover 170*c* and second housing mover 270*c*, and adjusts the first display position and the second display position, the light paths in housing 110 and housing 220 remain constant both before and after adjustment has been performed. Consequently, optical distortion can be suppressed in first virtual image 101 and second virtual image 201.

Although a case in which first housing mover 170*c* and second housing mover 270*c* cause housing 110 and housing 220 to rotationally move is described as an example in the present embodiment, a sliding movement may be performed instead. A sliding movement is movement in a direction of at least one of the up-and-down direction, a front-and-back direction, an optical axial direction, or the like. The rotational movement may be combined with the sliding movement.

Furthermore, it should be noted that adjustment of display positions by housing movers and adjustment of display positions by movers may be combined with each other. For example, it should be noted that adjustment of display positions by housing movers and adjustment of display positions by movers may be combined with each other in a single display unit. Alternatively, in a first display unit, display positions may be adjusted by a housing mover alone, and in a second display unit, display positions may be adjusted by a mover alone, for example.

Embodiment 6

Figure 9:
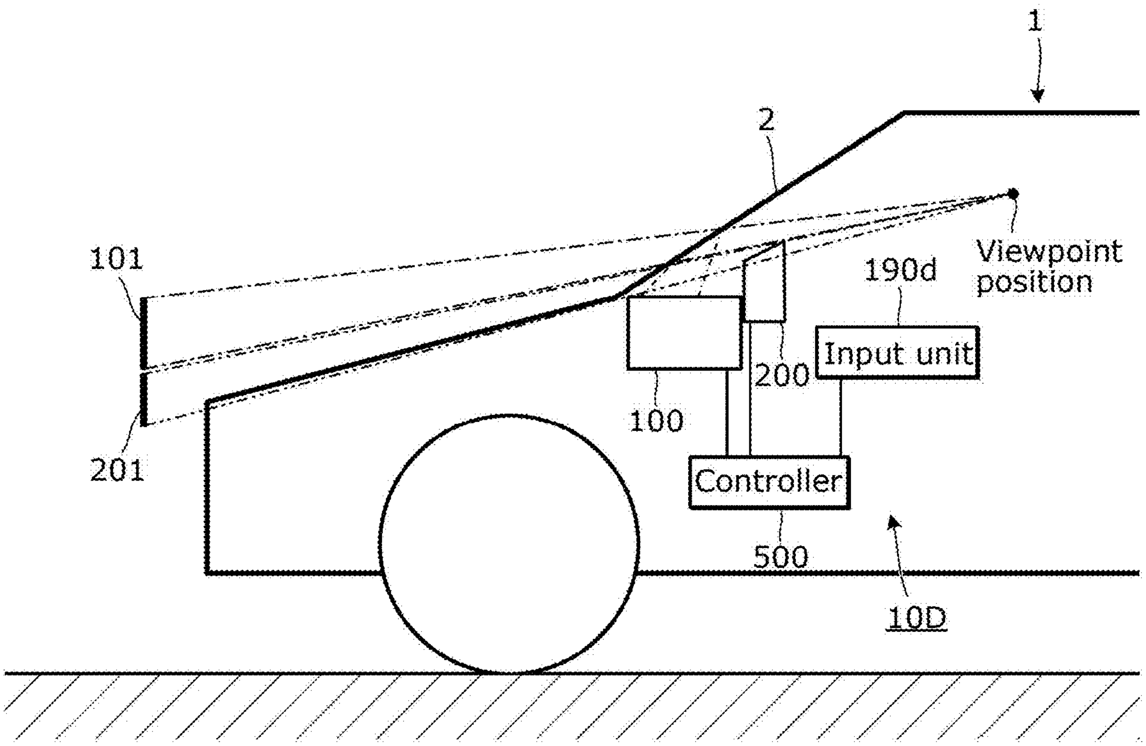
FIG. 9 is a schematic diagram illustrating a state in which a display system according to Embodiment 6 is provided in the vehicle.

FIG. 9 is a schematic diagram illustrating a state in which display system 10D according to Embodiment 6 is provided in vehicle 1. FIG. 9 is a diagram that corresponds to FIG. 1. As illustrated in FIG. 9, input unit 190*d*, to which various commands from the driver are input, is provided in display system 10D. Input unit 190*d* is, for example, an operable part that can be manipulated, such as a touch panel, control buttons, or the like. Input unit 190*d* may be provided in a dashboard, and may be provided in a steering wheel. An adjustment command to adjust the first display position of one virtual image (first virtual image 101, for example) of the plurality of virtual images is input to input unit 190*d*. Adjustment commands include a start command to start adjustment of the first display position, a move command to move the first display position, and a stop command. When a start command is input to input unit 190*d*, controller 500 starts adjusting the first display position. When a move command is input to input unit 190*d*, controller 500 controls first mover 170, and moves the first display position to a position that is in accordance with the move command. When a stop command is input, controller 500 stops adjustment of the first display position, and performs adjustment of a second display position.

Specifically, when a start command is input to input unit 190*d*, controller 500 controls display element 130 of first display unit 100, and projects a test image used for adjustment as first virtual image 101. The driver inputs a move command to input unit 190*d* while viewing first virtual image 101, which is a test image.

Controller 500 controls first mover 170 to adjust the first display position of first virtual image 101 based on the move command. Here, controller 500 estimates the viewpoint position of the driver from the adjustment amount of first virtual image 101. Specifically, since the installation coordinates of each optical component of first display unit 100 is already known, controller 500 can estimate the light emission direction of the image light after adjustment has been performed based on the installation coordinates of each optical component and the angle (adjustment amount) of second optical element 150 that has been changed by first mover 170. Next, controller 500 estimates, as a viewpoint position, a point of intersection between a standard forward-and-backward position (center line of the vehicle model "eyellipse") of the driver in vehicle 1 and the light emission direction.

Controller 500 controls second mover 270 to adjust the second display position of second virtual image 201 in a manner that corresponds to the viewpoint position based on the stop command.

Controller 500 estimates the viewpoint position based on the adjustment amount for first virtual image 101 that has been adjusted due to the adjustment command from the driver. In other words, even when there is no sensor (camera 600 or the like) for detecting the viewpoint position of the driver, the viewpoint position can still be estimated. Furthermore, since controller 500 adjusts the display position of second virtual image 201 based on the viewpoint position estimated, the second display position of second virtual image 201 can be promptly and automatically adjusted.

Here, a fine adjustment command from the driver may be input to input unit 190*d*. In this case, controller 500 makes fine adjustments to the second display position of second virtual image 201 based on the fine adjustment command input to input unit 190*d*. In this manner, since fine adjustments are made to the second display position of second virtual image 201 based on the fine adjustment command, fine adjustments can thereby be made to finely adjust the second display position of second virtual image 201 that has been automatically adjusted to a position that is intended by the driver.

Furthermore, display system 10D may also include a detector for detecting the viewpoint position of the driver. The detector may be camera 600 as described above, and other than this, may be a seat position sensor that detects a seat position of the driver, a distance measurement sensor, or the like. Controller 500 corrects the viewpoint position estimated based on a detection result of the detector. Accordingly, since the viewpoint position estimated is corrected based on the detection result of the detector, the viewpoint position can be more accurately estimated.

It should be noted that input unit 190*d* may be a voice sensor, such as a microphone or the like. In this case, the first display position of first virtual image 101 is moved in a direction that is intended by the driver by controller 500 performing a voice recognition process on voice audio that is input to input unit 190*d*. Here, since input unit 190*d* is a voice sensor, the driver can perform voice input of adjustment commands. Consequently, the manual input of the user becomes unnecessary when performing input of adjustment commands, and adjustment commands can thus be prevented from interfering with the user's driving operations.

Embodiment 7

In the above-mentioned Embodiment 1, by controlling first mover 170 and second mover 270 based on the estimation result, controller 500 adjusts at least one of the first display position or the second display position. Here, depending on the estimation result, in some cases, the adjustment amounts of the first display position and the second display position may exceed the adjustment ranges of first mover 170 and second mover 270. Specifically, in some cases, the viewpoint position of the driver may become higher than or lower than the adjustment range.

That is to say, when the adjustment amount of the display position (first display position or second display position) of at least one virtual image (first virtual image 101 or second virtual image 201) determined based on the estimation result exceeds the adjustment range of controller 500, an overrun alert is issued.

In the case of the first display position, the adjustment range is the adjustment range for first mover 170, and more specifically, is the rotational range of second optical element 150 that is rotated by first mover 170.

In the case of the second display position, the adjustment range is the adjustment range for second mover 270, and more specifically, is the rotational range of second mirror 260 that is rotated by second mover 270.

An overrun alert is an alert that notifies the driver that the adjustment amount of the display position has exceeded the adjustment range. Controller 500 controls at least one of first display unit 100 or second display unit 200 to cause an overrun alert to be displayed in at least one of first virtual image 101 or second virtual image 201. In this case, controller 500 and at least one of first display unit 100 or second display unit 200 are an example of an informer according to the present disclosure. It should be noted that other examples that can include an informer include a loudspeaker that can issue an overrun alert by voice, a light emitter that can issue an overrun alert by light, a vibration device that can issue an overrun alert by vibration, and the like. The vibration device may be in a format in which vibration is transmitted to the driver, or may be in a format in which the display content of at least one of first display unit 100 or second display unit 200 is caused to vibrate. A configuration in which the display content of at least one of first display unit 100 or second display unit 200 is caused to vibrate may be implemented by controller 500, for example, controlling at least one of first mover 170 or second mover 270 to cause repeated, minute rotational movements to occur in at least one of second optical element 150 or second mirror 260. Alternatively, controller 500 may cause the display content of at least one of display element 130 or display element 230 to repeatedly move in an up-and-down direction, for example. Alternatively, controller 500 may control a vibration actuator not shown in the drawings to cause at least one of the entirety of first display unit 100 or the entirety of second display unit 200 to vibrate.

In this manner, when the adjustment amount of the display position relative to at least one virtual image determined based on an estimation result exceeds the adjustment range, since controller 500 issues an overrun alert, the driver can recognize the adjustment range by the overrun alert, thereby making it possible to move the viewpoint position by moving the position of their head in accordance with the adjustment range or the like.

When controller 500 obtains an image captured by camera 600 and estimates the viewpoint position of the driver from the image captured, an overrun alert may still be issued even when it is estimated that the line of sight of the driver has moved in a horizontal direction and drifted away from the eye box. This is because first display unit 100 and second display unit 200 do not support adjustment of the display position in the horizontal direction. Here, a point (reference eye point) that represents the position of the eyes of the driver when in a typical driving state varies depending on the stature and posture of the driver, and the range within which the majority of reference eye points fall is referred to as the eye box of vehicle 1. The eye box is a virtual three-dimensional region.

Embodiment 8

In the above-mentioned Embodiment 7, a case in which the adjustment amount of the display position of at least one virtual image determined based on the estimation result exceeds the adjustment range of controller 500, and controller 500 issues an overrun alert is described as an example. In Embodiment 8, when the adjustment amount of the display position of at least one virtual image determined based on the estimation result exceeds the adjustment range of controller 500, controller 500 adjusts the display position of the at least one virtual image to a position near an upper limit or a lower limit of the adjustment range.

Here, although first display unit 100 will be described in detail as an example, the same applies to second display unit 200. When the adjustment amount of the first display position of first virtual image 101 determined as the estimation result exceeds the adjustment range, controller 500 controls first display unit 100, to adjust the display position of first virtual image 101 to a position near the upper limit or the lower limit of the adjustment range. Specifically, when the upper limit is exceeded due to the viewpoint position of the driver that is estimated becoming higher, controller 500 adjusts the first display position of first virtual image 101 to a position near the upper limit of the adjustment range. "Near the upper limit" refers to being located within an area that covers 20 percent of the adjustment range and includes the upper limit and its vicinity, and preferably refers to being located within an area that covers 10 percent of the adjustment range and includes the upper limit and its vicinity.

On the other hand, when the lower limit is exceeded due to the viewpoint position of the driver that is estimated becoming lower, controller 500 controls first display unit 100, to adjust the first display position of first virtual image 101 to a position near the lower limit of the adjustment range. "Near the lower limit" refers to being located within an area that covers 20 percent of the adjustment range and includes the lower limit and its vicinity, and preferably refers to being located within an area that covers about 10 percent of the adjustment range and includes the lower limit and its vicinity.

In this manner, when the adjustment amount of the display position of at least one virtual image determined based on the estimation result exceeds the adjustment range of the adjuster, controller 500 adjusts the display position of the at least one virtual image to a position near the upper limit or the lower limit of the adjustment range. Accordingly, even for a driver whose viewpoint position exceeds the adjustment range, the driver is able to recognize a virtual image that is positioned near the upper limit or the lower limit of the adjustment range by only minimally moving their head to move the viewpoint position. Note that in Embodiment 8 as well, the above-mentioned overrun alert may be issued.

Embodiment 9

Figure 10:
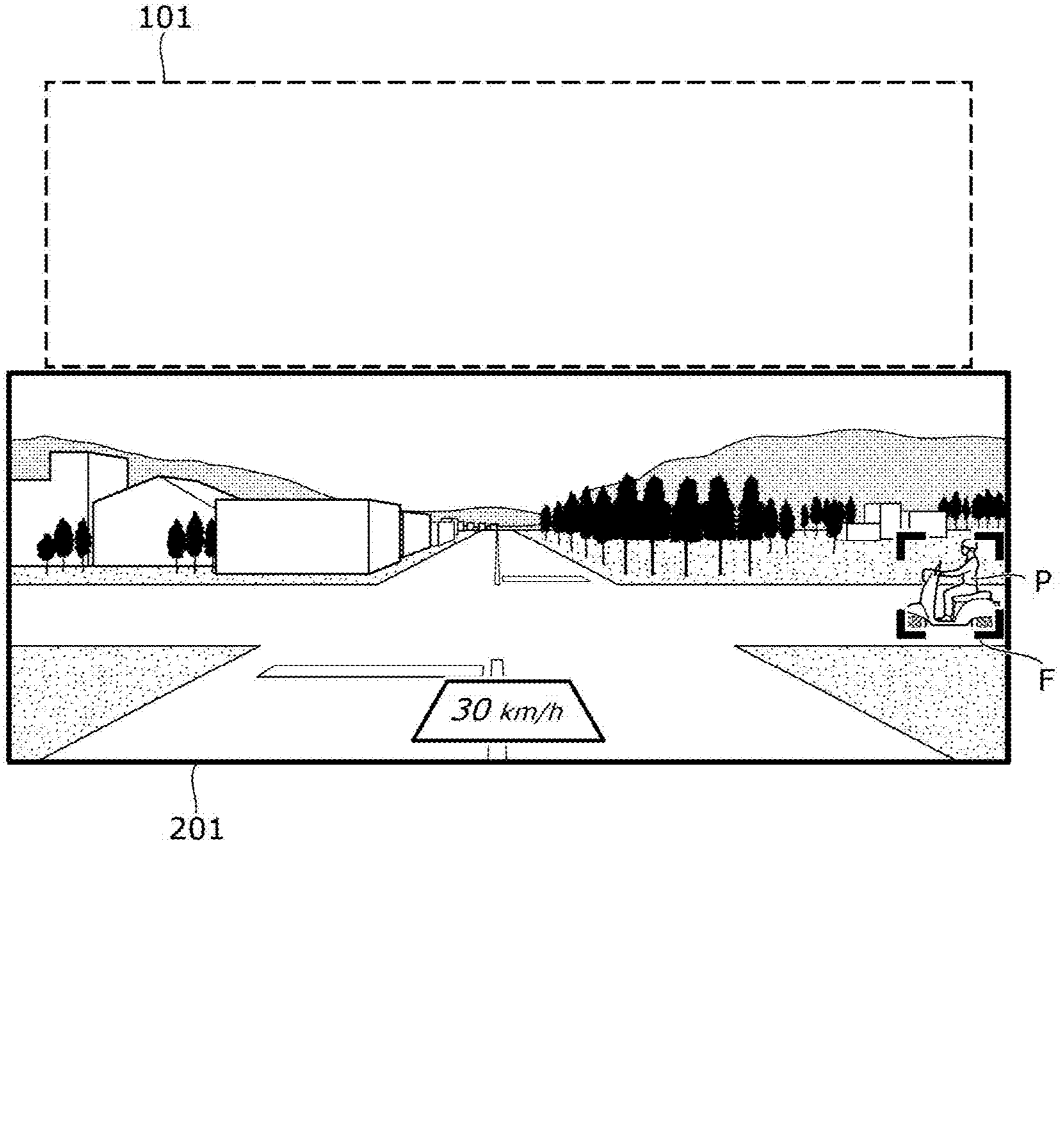
FIG. 10 is a diagram for describing a display example of a first virtual image and a second virtual image according to Embodiment 9.
Figure 11:
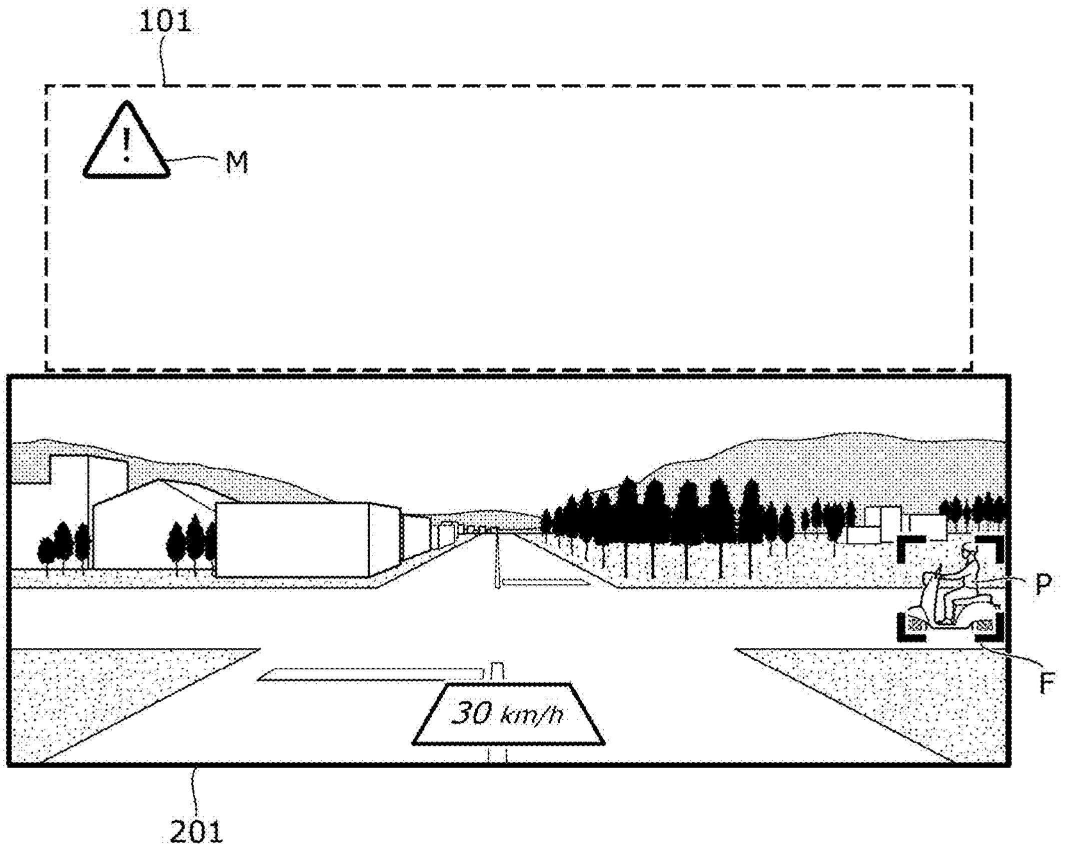
FIG. 11 is a diagram for describing a display example of a first virtual image and a second virtual image according to Embodiment 9.

FIG. 10 and FIG. 11 are diagrams for describing a display example of first virtual image 101 and second virtual image 201 according to Embodiment 9. In FIG. 10, second virtual image 201 includes image information that is captured by a vehicle external camera of vehicle 1. The vehicle external camera includes a front camera that captures an area in front of vehicle 1. In Embodiment 9, an image (image information) of the surroundings in front of vehicle 1 captured by the front camera is included in second virtual image 201.

Controller 500 detects a warning object in the surroundings of vehicle 1 by performing image processing on the image of the surroundings captured by the front camera. A warning object is a mobile body (pedestrian, animal, or vehicle other than vehicle 1 (automobile, two-wheeled vehicle, kick scooter, or the like)) that is present in the surroundings of vehicle 1.

When a warning object is detected in the surroundings of vehicle 1, controller 500 includes warning object P captured by the front camera in second virtual image 201, and causes second virtual image 201 to be projected by second display unit 200. In the present embodiment, in order to make warning object P more noticeable, highlight frame F is overlaid onto the image of the surroundings. Highlight frame F is not displayed until a warning object is detected in the surroundings of vehicle 1 based on image data.

Controller 500 obtains the image data of camera 600, and estimates the line of sight of the driver from the image data. Specifically, by performing predetermined image processing on the image captured, controller 500 extracts the pupils in the eyes of the driver, and estimates the line of sight from the inclination of the pupils.

Controller 500 determines whether the line of sight of the driver that is estimated is directed toward warning object P within a predetermined amount of time after warning object P has been displayed in second virtual image 201. In other words, controller 500 is an example of a determiner according to the present disclosure. The predetermined amount of time is an amount of time that is shorter than the amount of time that elapses after warning object P has been displayed until a point in time at which it will no longer be possible to avoid coming into contact with warning object P. The predetermined amount of time may be a fixed value that is set in advance, or may be a variable value that varies depending on conditions.

When it is determined that the line of sight of the driver is not directed toward warning object P within the predetermined amount of time, controller 500 issues a line-of-sight guidance alert. Specifically, as illustrated in FIG. 11, controller 500 controls first display unit 100, to include mark M, which is for issuing a line-of-sight guidance alert, in first virtual image 101 at a location that is closest to the direction of the line of sight of the driver that is estimated, within a displayable range of first virtual image 101. In the example in FIG. 11, since the direction of the line of sight of the driver that is estimated is the upper-left direction, controller 500 causes mark M to be displayed in the upper left of first virtual image 101. Controller 500 and first display unit 100 are an example of an informer according to the present disclosure. According to the alert issued with mark M, the driver can recognize the presence of warning object P, and can direct their line of sight toward warning object P. It should be noted that mark M for issuing a line-of-sight guidance alert is not limited to a configuration in which mark M is displayed in a location that is closest to the direction of the line of sight of the driver, and may instead be displayed in a noticeable manner in a central portion of first virtual image 101, for example.

When the line of sight of the driver that is estimated is directed toward warning object P, controller 500 causes guidance mark M to stop being displayed. The driver may use their voice or touch a button, or the like, to stop it from being displayed.

In this manner, when the line of sight of the driver is not directed toward warning object P within the predetermined amount of time, since a line-of-sight guidance alert will be issued, the line of sight of the driver can be guided toward warning object P by using the line-of-sight guidance alert.

It should be noted that the line-of-sight guidance alert may be any aspect as long as the line of sight of the driver is caused to be directed toward warning object P. It should be noted that other examples include a loudspeaker that can issue a line-of-sight guidance alert by voice, a light emitter that can issue a line-of-sight guidance alert by light, a vibration device that can issue a line-of-sight guidance alert by vibration, and the like. The vibration device may be in a format in which vibration is transmitted to the driver, or may be in a format in which the display content of at least one of first display unit 100 or second display unit 200 is caused to vibrate. When a visual line-of-sight guidance alert is issued by a light emitter, and if the line-of-sight guidance alert is issued at a direction toward which the line of sight of the driver is directed, the driver may be able to more easily notice warning object P.

Furthermore, here, although an example is described where controller 500 determines whether the line of sight of the driver is directed toward warning object P in second virtual image 201, controller 500 may determine whether the line of sight of the driver is directed toward the actual warning object. In this case, controller 500 determines whether the line of sight of the driver that is estimated is directed toward a coordinate position of the warning object included in the image information of the vehicle external camera. Other than this, controller 500 may determine that the line of sight of the driver is directed toward the warning object based on whether a portion of the warning object included in the image information of the vehicle external camera is included in a range of an effective viewing angle (30 degrees or less in a horizontal direction and 20 degrees or less in a vertical direction) of the driver when in a normal posture. Furthermore, other warning objects may include warning objects that are visible in a side-view mirror or warning objects that are visible in other display units.

Other Embodiments, Etc

Although a display system, and the like, according to one or more aspects of the present disclosure is described above based on the foregoing embodiments, the present disclosure is not limited to these embodiments. The one or more aspects according to the present disclosure may thus include forms obtained by making various modifications to the above embodiments that can be conceived by those skilled in the art, as well as forms obtained by combining structural components in different embodiments, without materially departing from the spirit of the present disclosure.

In the above-mentioned embodiments, an example is described in which a first display position of first virtual image 101 and a second display position of second virtual image 201 are adjusted in an up-and-down direction, based on a viewpoint position that is estimated. However, the first display position and the second display position may be adjusted in a front-and-back direction or a vehicle widthwise direction based on the viewpoint position that is estimated.

In the above-mentioned embodiments, an example is described in which one optical component is moved by one mover. However, at least two optical components may be moved by one mover. In this case, when compared to a case in which one mover is provided for each optical component that is an object to be moved, the configuration of the device can be simplified.

In the above-mentioned embodiments, an example is described in which one camera 600 is provided as a detector for detecting the viewpoint position of a driver. However, a plurality of detectors may be provided. The plurality of detectors may each be the same type of detector, and may each be a different type of detector. Examples of detectors other than camera 600 include seat position sensors and distance measurement sensors. In this case, controller 500 estimates the viewpoint position of the driver based on a detection result of the plurality of detectors. Since the viewpoint position of the driver is estimated based on the detection results of the plurality of detectors, the viewpoint position can be estimated with a high degree of accuracy. Consequently, positional misalignment of a plurality of virtual images can be more accurately suppressed. Camera 600 may be a stereo camera. In this case, a three-dimensional position of the viewpoint position can be more accurately detected.

Furthermore, the detector may estimate and detect the viewpoint position of the driver from an angle of at least one of a side-view mirror or an electronic rear-view mirror. In this case, a viewpoint position can be detected with a simple configuration.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2024-167494 filed on Sep. 26, 2024 and Japanese Patent Application No. 2025-070170 filed on Apr. 22, 2025.

INDUSTRIAL APPLICABILITY

The present disclosure is applicable to a display system for displaying a virtual image.

The invention claimed is:

1. A display system comprising:
a plurality of displays that project a plurality of virtual images in front of a user; and
a processor that:
estimates a viewpoint position of the user; and
adjusts a display position of at least one virtual image among the plurality of virtual images based on an estimation result of the processor, wherein
each of the plurality of displays includes:
a display element that displays an image on which a corresponding one of the plurality of virtual images is based, and emits image light of the image; and
a final reflector that reflects, toward the user, the image light emitted by the display element,
the plurality of final reflectors included in the plurality of displays are provided as separate units,
the plurality of virtual images is arranged in an up-and-down direction,
a reflectance of a final exit surface that forms a first virtual image is larger than a reflectance of a final reflector that forms a second virtual image, the first virtual image and the second virtual image being a pair of virtual images that are adjacent in the up-and-down direction, the first virtual image having a depression angle or an elevation angle with an absolute value that is larger than an absolute value of a depression angle or an elevation angle of the second virtual image, the pair of virtual images being included in the plurality of virtual images.

2. The display system according to claim 1, wherein
the processor adjusts a display position of each of the plurality of virtual images based on the estimation result of the processor.

3. The display system according to claim 1, wherein
the processor adjusts a display position of at least one virtual image among the plurality of virtual images to cause a distance between two of the plurality of virtual images to fall within a predetermined interval.

4. The display system according to claim 3, wherein
the processor adjusts a display position of at least one virtual image among the plurality of virtual images to cause a distance between a lower edge of a displayable range of a virtual image positioned upward and an upper edge of a displayable range of a virtual image positioned downward to fall within a predetermined range, the virtual image positioned upward and the virtual image positioned downward being a second pair of virtual images that are adjacent in the up-and-down direction, the second pair of virtual images being included in the plurality of virtual images.

5. The display system according to claim 4, wherein
the plurality of displays includes three or more displays.

6. The display system according to claim 1, wherein
each of the plurality of displays further includes:
a plurality of optical components that include the display element and the final reflector; and
a mover that moves at least one optical component among the plurality of optical components, and
the processor controls the mover to adjust the display position.

7. The display system according to claim 6, wherein
the mover moves at least two optical components among the plurality of optical components.

8. The display system according to claim 6, wherein
the processor controls the mover to adjust a viewing distance of the at least one virtual image by adjusting the display position.

9. The display system according to claim 1, wherein
the processor adjusts the display position by adjusting a coordinate position of the image in the display element.

10. The display system according to claim 1, further comprising:

an input to which an adjustment command from the user is input, wherein the processor adjusts a first display position of one virtual image, among the plurality of virtual images, based on the adjustment command from the user, the processor estimates the viewpoint position based on an adjustment amount of the one virtual image, and the processor adjusts a second display position of an other virtual image, among the plurality of virtual images, based on the viewpoint position estimated.

11. The display system according to claim 10, wherein a fine adjustment command from the user is input to the input, and the processor finely adjusts the second display position of the other virtual image based on the fine adjustment command.

12. The display system according to claim 10, further comprising:

at least one of a camera or a sensor that detects the viewpoint position of the user, wherein the processor corrects the viewpoint position estimated based on a detection result of the detector.

13. The display system according to claim 1, further comprising:

a camera that captures an image of the user, wherein the processor estimates the viewpoint position of the user based on the image captured by the camera.

14. The display system according to claim 1, further comprising:

a plurality of cameras or sensors that detect the viewpoint position of the user, wherein the processor estimates the viewpoint position of the user based on a detection result of the plurality of cameras or sensors.

15. The display system according to claim 1, wherein the plurality of displays is arranged to cause light paths from the display elements to the final reflectors to be spatially independent.

16. The display system according to claim 15, wherein each of the plurality of displays further includes:

a plurality of optical components that include the display element and the final reflector;

a housing that houses at least one of the plurality of optical components; and a housing mover that moves the housing, and the processor controls the housing mover to adjust the display position.

17. The display system according to claim 1, wherein the display element adds, to the image, distortion of an amount based on an adjustment amount of the display position.

18. The display system according to claim 1, wherein when an adjustment amount of the display position of the at least one virtual image exceeds a predetermined adjustment, the processor issues an overrun alert, the at least one virtual image being determined based on the estimation result of the processor.

19. The display system according to claim 1, wherein the processor determines whether a line of sight of the user is directed toward a warning object within a predetermined amount of time after the warning object has been displayed in at least one display among the plurality of displays, and when the processor determines that the line of sight of the user is not directed toward the warning object within the predetermined amount of time, the processor issues a line-of-sight guidance alert.

20. A display system, comprising:

a plurality of displays that project a plurality of virtual images in front of a user; and a processor that:

estimates a viewpoint position of the user; and adjusts a display position of at least one virtual image among the plurality of virtual images based on an estimation result of the processor, wherein each of the plurality of displays includes:

a display element that displays an image on which a corresponding one of the plurality of virtual images is based, and emits image light of the image; and a final reflector that reflects, toward the user, the image light emitted by the display element, the plurality of final reflectors included in the plurality of displays are provided as separate units, the plurality of displays is arranged to cause light paths from the display elements to the final reflectors to be spatially independent, each of the plurality of displays further includes:

a plurality of optical components that include the display element and the final reflector;

a housing that houses at least one of the plurality of optical components; and a housing mover that moves the housing, and the processor controls the housing mover to adjust the display position.

* * * * *